(12) United States Patent
Fujinami et al.

(10) Patent No.: US 6,269,063 B1
(45) Date of Patent: Jul. 31, 2001

(54) RECORDING/REPRODUCING APPARATUS AND METHOD AND PROGRAM OFFERING MEDIUM

(75) Inventors: Yasushi Fujinami, Tokyo; Toshiya Hamada, Saitama, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/301,100

(22) Filed: Apr. 28, 1999

(30) Foreign Application Priority Data

Apr. 30, 1998 (JP) .................................................. 10-120393

(51) Int. Cl.⁷ .................................................. G11B 7/004
(52) U.S. Cl. ..................... 369/53.44; 369/47.31; 369/47.23
(58) Field of Search ............................. 369/47.54, 47.23, 369/47.29, 47.3, 47.31, 53.31, 53.34, 53.43; 386/95

(56) References Cited

U.S. PATENT DOCUMENTS

| | | | |
|---|---|---|---|
| 4,899,326 | * | 2/1990 | Takeya et al. .......................... 369/33 |
| 5,235,578 | * | 8/1993 | Baas et al. .......................... 369/47.54 |
| 5,691,972 | * | 11/1997 | Tsuga et al. ....................... 369/53.21 |
| 5,745,645 | * | 4/1998 | Nakamura et al. ..................... 386/95 |
| 5,771,334 | * | 6/1998 | Yamauchi et al. ..................... 386/95 |
| 5,945,953 | * | 9/1999 | Shirakawa et al. ..................... 386/95 |
| 6,009,433 | * | 12/1999 | Kurano et al. ......................... 369/272 |

* cited by examiner

Primary Examiner—Thang V. Tran
(74) Attorney, Agent, or Firm—Frommer Lawrence & Haug, LLP.; William S. Frommer

(57) ABSTRACT

To ensure compatibility of apparatus, seamless_connection_flag is set to 1 when a succeeding play item can be reproduced in seamless reproduction consecutive to a previous play item and set to 0 when seamless reproduction cannot be guaranteed.

8 Claims, 30 Drawing Sheets

FIG. 2

| Syntax | Number of Bits | Mnemonic |
|---|---|---|
| VOLUME. TOC{ | | |
|     file_type_id | 8*16 | char[16] |
|     voleme_information() | | |
|     text_block() | | |
| } | | |

FIG. 3

| Syntax | Number of Bits | Mnemonic |
|---|---|---|
| volume_information() { | | |
|     volume_attribute() | | |
|     resume() | | |
|     volume_rating() | | |
|     write_protect() | | |
|     play_protect() | | |
|     recording_timer() | | |
| } | | |

FIG. 4

| Syntax | Number of Bits | Mnemonic |
|---|---|---|
| volume_attribute() { | | |
|     volume_attribute_length | 32 | uimsdf |
|     vdr_version | 4*4 | bcd |
|     reserved | 6 | bslbf |
|     title_playback_mode_flag | 1 | bslbf |
|     program_playback_mode_flag | 1 | bslbf |
|     volume_play_time() | 4*8 | bcd |
|     update_time_count() | 32 | uimsbf |
|     maker_id | 8*16 | char[16] |
|     model_code | 8*16 | char[16] |
|     POSID | 32 | bslbf |
| } | | |

FIG. 5

| Syntax | Number of Bits | Mnemonic |
|---|---|---|
| resume () { | | |
|     resume_length | 32 | uimsbf |
|     reserved          //for byte alignme | 3 | bslbf |
|     resume_switch | 1 | bit |
|     reserved | 4 | bslbf |
|     number_of_records | 4 | uimsbf |
|     reserved          //for byte alignme | 7 | bslbf |
|     resume_auto_execute_time_flag | 1 | bit |
|     resume_auto_execute_time_() | 4*14 | bcd |
|     reserved | 4 | bslbf |
|     resume_auto_execute_record_number | 4 | uimsbf |
|     for(i=0;i<number_of_records;i++){ | | |
|         resume_mode_flag | 4 | bslbf |
|         object_type | 4 | bslbf |
|         linked_record_number | 4 | uimsbf |
|         number_of_times | 16 | uimsbf |
|         resume_updated_time() | 4*14 | bcd |
|         switch(object_type){ | | |
|             case title: | | |
|                 title_number | 16 | uimsbf |
|                 title_local_time_stamp | 64 | uimsbf |
|                 break; | | |
|             case program: | | |
|                 program_number | 16 | uimsbf |
|                 program_local_time_stamp | 64 | uimsbf |
|                 break; | | |
|             case program_bind | | |
|                 program_bind_number | 16 | uimsbf |
|                 program_ordre | 16 | uimsbf |
|                 program_number | 16 | uimsbf |
|                 program_local_time_stamp | 64 | uimsbf |
|                 break; | | |
|             case play_item: | | |
|                 play_item_number | 16 | uimsbf |
|                 play_item_local_time_stamp | 64 | uimsbf |
|                 break | | |
|         } | | |
|     } | | |
| } | | |

FIG. 6

| Syntax | Number of Bits | Mnemonic |
|---|---|---|
| volume_rating() | | |
|     volume_rating_length | 32 | uimsbf |
|     reserved | 6 | bslbf |
|     volume_rating_type | 2 | bslbf |
|     volume_rating_password | 128 | bslbf |
|     switch(rating_type) { | | |
|         case age_limited | | |
|             country_code_for_rating | 32 | bslbf |
|             for(i=0;i<32;i++) { | | |
|                  rating_bit_for_ago_limited | 1 | bslbf |
|             break; | | |
|         case CARA: | | |
|             CARA_category | 4 | bslbf |
|             reserved | 4 | bslbf |
|             reserved | 16 | bslbf |
|             break; | | |
|         case RSAC: | | |
|             RSAC_category | 4 | bslbf |
|             level | 4 | bslbf |
|             reserved | 16 | bslbf |
|             break; | | |
|     } | | |
| } | | |

FIG. 7

| Syntax | Number of Bits | Mnemonic |
|---|---|---|
| write_protect() | | |
|     write_protect_length | 32 | uimsbf |
|     volume_write_protect_level | 4 | uimsbf |
|     password_enable_flag | 1 | bslbf |
|     apped_only_flag | 1 | bslbf |
|     expiration_time_enable_flag | 1 | bslbf |
|     number_of_times_enable_flag | 1 | bslbf |
|     password_for_volume_write_protect() | 128 | bslbf |
|     reserved | 8 | bslbf |
|     write_protect_set_time() | 56 | bcd |
|     reserved | 8 | bslbf |
|     write_protect_expirartion_time() | 56 | bcd |
|     number_of_times | 16 | uimsbf |
| } | | |

FIG. 8

| Syntax | Number of Bits | Mnemonic |
|---|---|---|
| play_protect() { | | |
|     play_protect_length | 32 | uimsbf |
|     volume_play_protect_flag | 2 | bslbf |
|     reserved | 2 | bslbf |
|     password_enable_flag | 1 | bslbf |
|     reserved | 1 | bslbf |
|     expiration_time_enable_flag | 1 | bslbf |
|     number_of_times_enable_flag | 1 | bslbf |
|     password_for_volume_play_protect | 128 | bslbf |
|     rederved | 8 | bslbf |
|     play_protect_set_time() | 56 | bcd |
|     reserved | 8 | bslbf |
|     play_protect_expiration_time() | 56 | bcd |
|     number_of_times | 16 | uimsbf |
| } | | |

FIG. 9

| Syntax | Number of Bits | Mnemonic |
|---|---|---|
| recording_timer() { | | |
|     recording_timer_length | | |
|     recording_timer_flag | | |
|     number_of_entry | | |
|     for(i=0;i<number_of_entry;i++){ | | |
|         date_and_time | | |
|         channel | | |
|         program | | |
|         : | | |
|     } | | |
| } | | |

FIG.10

| Syntax | Number of Bits | Mnemonic |
|---|---|---|
| text_block(){ | 32 | uimsbf |
|     text_block_length | 8 | uimsbf |
|     number_of_language_sets | 16 | uimsbf |
|     number_of_text_items | | |
|     for(i=0;i<number_of_language_sets;i++){ | | |
|         language_set() | | |
|     } | | |
|     for(i=0;i<number_of_text_items;i++){ | | |
|         text_item() | | |
|     } | | |
| } | | |

FIG.11

| Syntax | Number of Bits | Mnemonic |
|---|---|---|
| language_set(){ | | |
|     reserved | 8 | bslbf |
|     language_code | 24 | bslbf |
|     character_set_type | 8 | bslbf |
|     number_of_language_set_names | 8 | uimsbf |
|     for(i=0;i<number_of_language_set_names;i++){ | | |
|         character_set_type | 8 | bslbf |
|         language_set_name_length | 8 | uimsbf |
|         language_set_name | 8*language_set_name_length | bslbf |
|     } | | |
| } | | |

F I G .12

| Syntax | Number of Bits | Mnemonic |
| --- | --- | --- |
| text_item(){ | | |
|     text_item_length | 16 | uimsbf |
|     text_item_id | 16 | uimsbf |
|     text_item_sub_id | 16 | uimsbf |
|     flags | 8 | bslbf |
|     number_of_used_language_sets | 8 | uimsbf |
|     // loop for each language set | | |
|     for(i=0;i<number_of_used_language_sets;i++){ | | |
|         language_set_id | 8 | uimsbf |
|         reserved | 4 | bslbf |
|         text_string_length | 16 | uimsbf |
|         text_string | 8*text_string_length | bslbf |
|         bitmap() | | |
|     } | | |
|     stuffing_bytes | 8*n | bslbf |
| } | | |

F I G .13

| Syntax | Number of Bits | Mnemonic |
| --- | --- | --- |
| ALBUM. STR{ | | |
|     file_type_id | 8*16 | char[16] |
|     album() | | |
|     text_block() | | |
| } | | |

FIG.14

| Syntax | Number of Bits | Mnemonic |
|---|---|---|
| album (){ | | |
|     album_length | 32 | uimsbf |
|     reserved | 6 | bslbf |
|     volume_status | 1 | bslbf |
|     if(volume_status=="1b"){ | | |
|       chief_volume_flag | 1 | bslbf |
|     }else{ | | |
|       reserved | 1 | "0" |
|     } | | |
| | | |
|     if(volume_status=="1b"){ | | |
|       if(chief_volume_flag=="1b"){ | | |
|         reserved | 6 | bslbf |
|         album_type | 2 | bslbf |
|         album id | 128 | bslbf |
| | | |
|         number_of_discs_in_album | 16 | uimsbf |
|         number_of_volumes_in_album | 16 | uimsbf |
| | | |
|         for(i=0;i<number_of_volumes_in_album;i++){ | | |
|           disc_id_for_album_member | 128 | bslbf |
|           volume_id_for_album_member | 128 | bslbf |
|           title_offset_number | 16 | uimsbf |
|         } | | |
|         reserved_for_program_bind | 8 | bslbf |
|         number_of_program_binds | 8 | uimsbf |
|         for(i=0;i<number_of_program_binds;i++){ | | |
|           number_of_programs_in_this_program_bi | 16 | uimsbf |
|           for(i=0;i<number_of_programs_in_this_program_bind;i++){ | | |
|           disc_id_for_program_bind_member | 128 | uimsbf |
|           volume_id_for_program_bind_member | 128 | uimsbf |
|           program_number | 16 | uimsbf |
|         } | | |
|     }else{    // chief_volume_flag=="0b" | | |
|       chief_disc_id | 128 | uimsbf |
|       chief_volume_id | 128 | uimsbf |
|       (album_id | 128 | bslbf |
|       } | | |
|     } | | |
|   } | | |
| } | | |

FIG.15

| Syntax | Number of Bits | Mnemonic |
|---|---|---|
| TITLE_###. VDR{ | | |
|     file_type_id | 8*16 | char[16] |
|     title_info() | | |
|     text_block() | | |
| } | | |

FIG.16

| Syntax | Number of Bits | Mnemonic |
|---|---|---|
| title_info() { | | |
|     title_info_length | 32 | uimsbf |
|     flags_for_title | 32 | bslbf |
|     cgit_file_id | 16 | uimsbf |
|     title_start_chunk_group_time_stamp | 64 | uimsbf |
|     title_end_chunk_group_time_stamp | 64 | uimsbf |
|     title_playback_time() | 32 | bcd |
|     reserved | 32 | bslbf |
|     number_of_marks | 16 | uimsbf |
|     for(i=0;i<number_of_marks;i++) { | | |
|         reserved | 4 | bslbf |
|         mark_type | 4 | bslbf |
|         mark_chunk_group_time_stamp | 64 | uimsbf |
|     } | | |
|     stuffing_bytes | 8*n | bslbf |
| } | | |

FIG.17

| Syntax | Number of Bits | Mnemonic |
|---|---|---|
| PROGRAM_$ $ $. PGI | | |
|     file_type_id | 8*16 | char[16] |
|     program() | | |
|     text_block() | | |
| } | | |

F I G. 18

| Syntax | Number of Bits | Mnemonic |
| --- | --- | --- |
| program() { | | |
|     program_length | 32 | uimsbf |
|     flags_for_program | 32 | bslbf |
|     program_status | 4 | bslbf |
|     program_playback_time() | 32 | bcd |
|     reserved | 32 | bslbf |
|     number_of_play_sequences | 16 | uimsbf |
|     for(j=0;j<number_of_play_sequence;j++) { | | |
|         number_of_play_lists | 16 | uimsbf |
|         for(k=0;k<number_of_play_lists;k++) { | | |
|             play_list_start_time_stamp_offset | 64 | uimsbf |
|             play_list(k) | | |
|         } | | |
|     } | | |
|     stuffing_bytes | 8*n | bslbf |
| } | | |

F I G. 19

| Syntax | Number of Bits | Mnemonic |
| --- | --- | --- |
| play_list() { | | |
|     //playback sequence of play items in this play list | | |
|     number_of_play_items | 16 | uimsbf |
|     for(k=0;k<number_of_play_items;k++) { | | |
|         play_item_number | 16 | uimsbf |
|         reserved | 31 | bslbf |
|         seamless_connection_flag | 1 | bslbf |
|     } | | |
|     //play_item_table | | |
|     for(PIN=t;PIN<=number_of_play_items_in_program;PIN++) { | | |
|         play_item() | | |
|     } | | |
| } | | |

FIG.20

| Syntax | Number of Bits | Mnemonic |
|---|---|---|
| play_item(){ | | |
|     play_item_length | 32 | uimsbf |
|     play_item_type | 8 | bslbf |
|     play_mode | 8 | bslbf |
|     total_playback_time () | 32 | bcd |
|     menu_item_number | 16 | uimsbf |
|     return_item_number | 16 | uimsbf |
|     next_item_number | 16 | uimsbf |
|     prev_item_number | 16 | uimsbf |
|     if(play_item_type="0000b") { | | |
|       // play item for one "cut" | | |
|       title_number | 16 | uimsbf |
|       // IN point | | |
|       item_start_time_stamp | 64 | uimsbf |
|       // OUT point | | |
|       item_end_time_.stamp | 64 | uimsbf |
|     } | | |
| } | | |

FIG.21

| Syntax | Number of Bits | Mnemonic |
|---|---|---|
| CHUNKGROUP_###.CGIT { | | |
|     file_type_id | 8*16 | char[16] |
|     chunkgroup_time_base_flags | 32 | bslbf |
|     chunkgroup_time_base_offset | 64 | uimsbf |
|     chunk_connection_info() | | |
|     text_block() | | |
| } | | |

FIG. 22

| Syntax | Number of Bits | Mnemonic |
|---|---|---|
| chunk_connection_into() { | 32 | uimsbf |
|     chunk_connection_info_length | 16 | bslbf |
|     reserved | 16 | uimsbf |
|     number_of_chunks | 8 | bslbf |
|     chunk_sync_play_flag | | |
|     //chunk info file list | | |
|     for(i=0;i<number_of_chunks;i++) { | | |
|         chunk_arrangement_info() | | |
|     } | | |
| } | | |

FIG. 23

| Syntax | Number of Bits | Mnemonic |
|---|---|---|
| chunk_arrangement_info() { | | |
|     chunk_arrangement_info_length | 32 | uimsbf |
|     chunk_info_file_id | 16 | bslbf |
|     reserved | 5 | bslbf |
|     chunk_switch_stream_id | 16 | bslbf |
|     presentation_start_cg_time_count | 64 | uimsbf |
|     presentation_end_cg_time_count | 64 | uimsbf |
|     reserved | 4 | bslbf |
|     chunk_time_count_type | 4 | bslbf |
|     number_of_start_original_time_count_extension | 8 | uimsbf |
|     number_of_end_original_time_count_extension | 8 | uimsbf |
|     //presentation start position and time | | |
|     presentation_start_original_time_count | 64 | uimsbf |
|     presentation_end_original_time_count | 64 | uimsbf |
|     for(j=0;j<number_of_start_original_time_count_extension;j++) | | |
|         tc_ext_attributes | 16 | bslbf |
|         start_original_time_count_extension | 64 | uimsbf |
|     } | | |
|     //presentation end position and time | | |
|     for(k=0;k<number_of_end_original_time_count_extension;k++) { | | |
|         tc_ext_attributes | 16 | bslbf |
|         end_original_time_count_extension | 64 | uimsbf |
|     } | | |
|     transition_info() | | |
| } | | |

FIG. 24

| Syntax | Number of Bits | Mnemonic |
|---|---|---|
| CHUNK_%%%%. ABST{ | | |
|     file_type_id | 8* 16 | char[16] |
|     reserved | 4 | bslbf |
|     chunk_file_id | 16 | uimsbf |
|     info_type | 4 | bslbf |
|     // stream_info () | | |
|     if(info_type=="MPEG2_System_TS"){ | | |
|         number_of_programs | 8 | uimsbf |
|     else { | | |
|         number_of_programs | 8 | "0000 0001" |
|     } | | |
|     for(i=0;i<number<of_programs;i++){ | | |
|         number_of_streams | 8 | uimsbf |
|         for(i=0;i<number_of_streams;i++){ | | |
|             stream_identifier | 8 | bslbf |
|             // slot type information | | |
|             reserved | 4 | bslbf |
|             slot_unit_type | 4 | bslbf |
|             if(slot_unit_type=="time_stamp"){ | | |
|                 slot_time_length | 32 | uimsbf |
|             } else { | | |
|                 reserved | 32 | bslbf |
|             } | | |
|             number_of_slots | 32 | uimsbf |
|             reserved | 4 | bslbf |
|             switch(info_type){ | | |
|                 case MPEG1_System: | | |
|                 case MPEG2_System_PS: | | |
|                 case MPEG2_System_TS: | | |
|                 case video_elementary_stream | | |
|                     number_of_i_pictures_in_a_slot | 4 | uimsbf |
|                     break | | |
|                 default: | | |
|                     reserved | 4 | bslbf |
|                     break; | | |
|             } | | |
|             // stream attribute | | |
|             ES_attribute() | | |
|     } | | |
|     // loop of slot info | | |
|     for(i=0;i<number_of_streams;i++){ | | |
|         for(i=0;i<number_of_slots;i++){ | | |
|             slot_info () | | |
|         } | | |
|     } | | |
|     } | | |
| } | | |

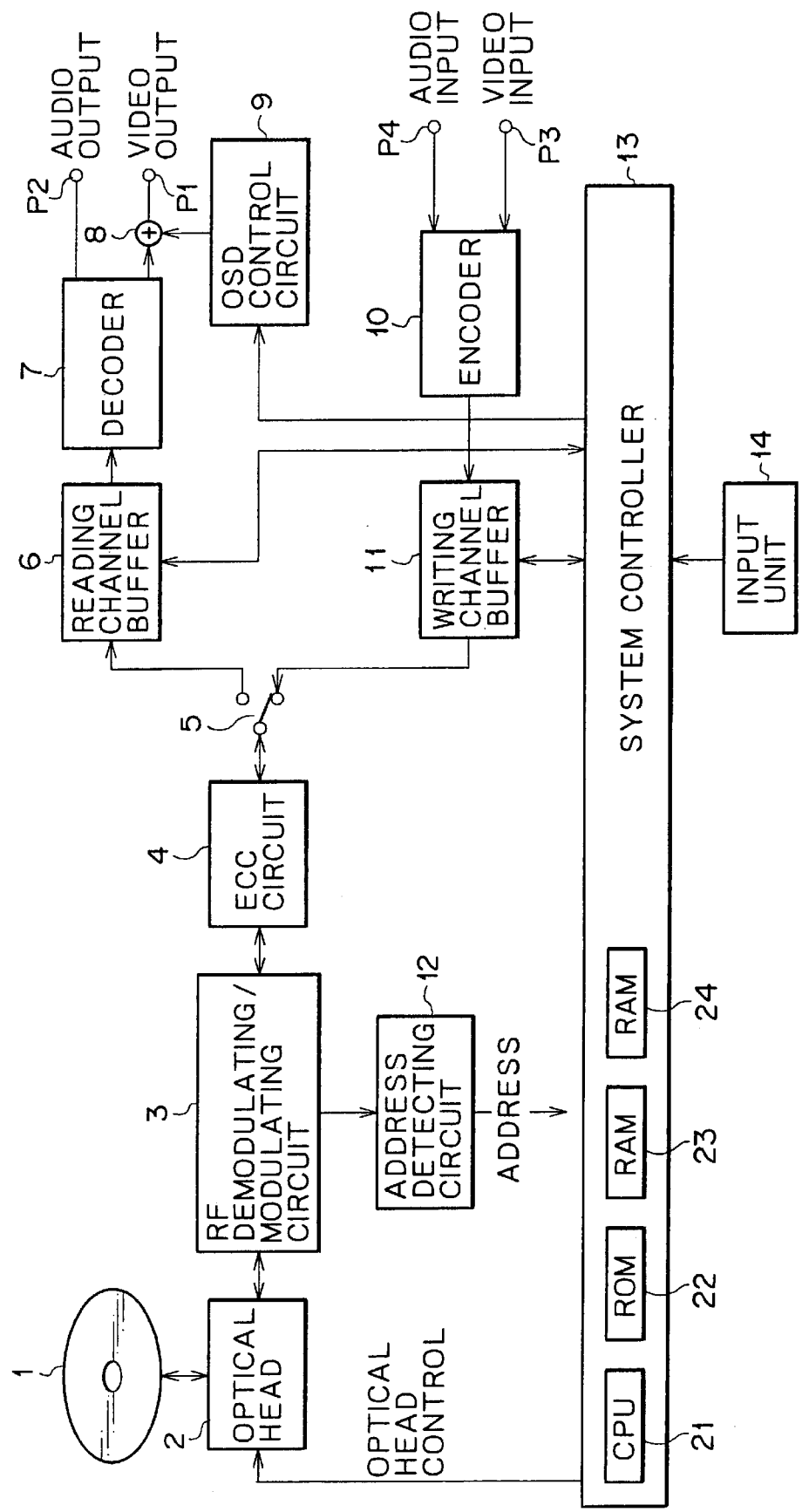

FIG.26

```
/--- VOLUME.TOC
  - ALBUM.STR
  - PROGRAM
  |      -PROGRAM_001.PGI
  - TITLE
  |      -TITLE_001.VDR
  |      -TITLE_002.VDR
  |      -TITLE_003.VDR
  |
  - CHUNKGROUP
  |      -CHUNKGROUP_001.CGIT
  |      -CHUNKGROUP_002.CGIT
  |
  - CHUNK
  |      -CHUNK_0001.ABST
  |      -CHUNK_0011.ABST
  |      -CHUNK_0012.ABST
  |
  - MPEGAV
  |      -STREAMS_001
  |      |      -CHUNK_0001.MPEG2
  |      |
  |      -STREAMS_002
  |      |      -CHUNK_0011.MPEG2
  |      |      -CHUNK_0012.MPEG2
```

FIG.29

```
/------MPEGAV
|       -STREAMS_003
|       |      -CHUNK 0031. MPEG2
|       |
```

FIG.30

```
/---VOLUME. TOC
   -ALBUM. STR
   -PROGRAM
   |      -PROGRAM_001. PGI
   -TITLE
   |      -TITLE_001. VDR
   |
   |      -TITLE_003. VDR
   |      -TITLE_004. VDR*
   |
   -CHUNKGROUP
   |      -CHUNKGROUP_001. CGIT
   |      -CHUNKGROUP_002. CGIT
   |      -CHUNKGROUP_003. CGIT*
   -CHUNK
   |      -CHUNK_0001. ABST
   |      -CHUNKGROUP_002. CGIT
   |      -CHUNKGROUP_003. CGIT*
   |
   -MPEGAV
          -STREAMS_0001
          |       -CHUNK_0001. MPEG2
          |
          -STREAMS_0002
          |       -CHUNK_0011. MPEG2
          |       -CHUNK_0012. MPEG2
          |
          -STREAMS_0003*
          |       -CHUNK_0031. MPEG2*
          |
```

FIG. 32

```
/ ------ MPEGAV
         ─STREAMS_002
                 ─CHUNK 0031.MPEG2
```

FIG. 33

```
/ ---VOLUME. TOC
    ─ALBUM. STR
    ─PROGRAM
            ─PROGRAM_001. PGI
    ─TITLE
            ─TITLE_001. VDR
            ─TITLE_002. VDR
            ─TITLE_003. VDR
            ─TITLE_004. VDR*

─CHUNKGROUP
            ─CHUNKGROUP_001. CGIT
            ─CHUNKGROUP_002. CGIT

─CHUNK
            ─CHUNK_0001. ABST
            ─CHUNK_0011. ABST
            ─CHUNK_0012. ABST
            ─CHUNK_0031. ABST*
    ─MPEGAV
            ─STREAMS_0001
                    ─CHUNK_0001. MPEG2

─STREAMS_0002
                    ─CHUNK_0011. MPEG2
                    ─CHUNK_0012. MPEG2
                    ─CHUNK_0031. MPEG2*
```

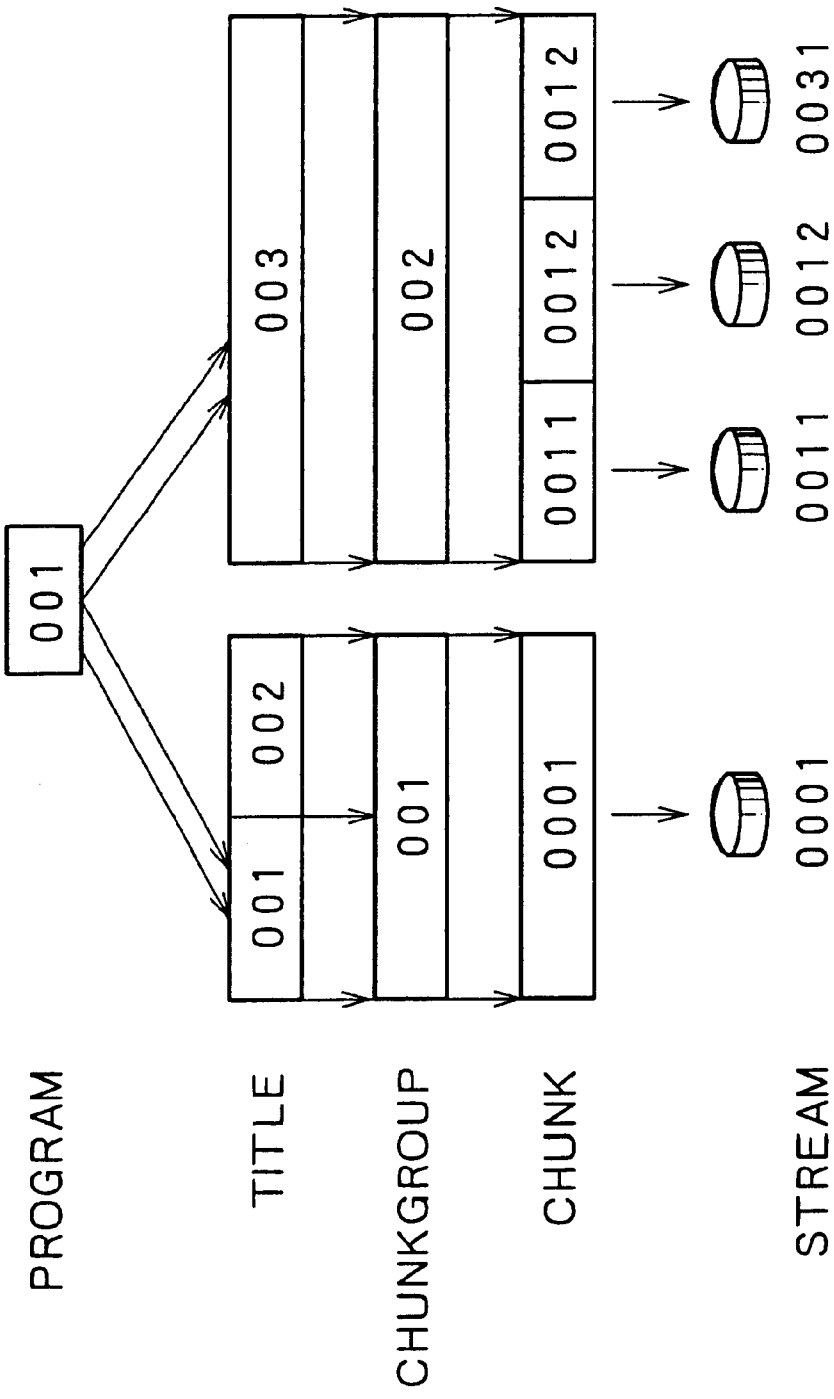
F I G. 34

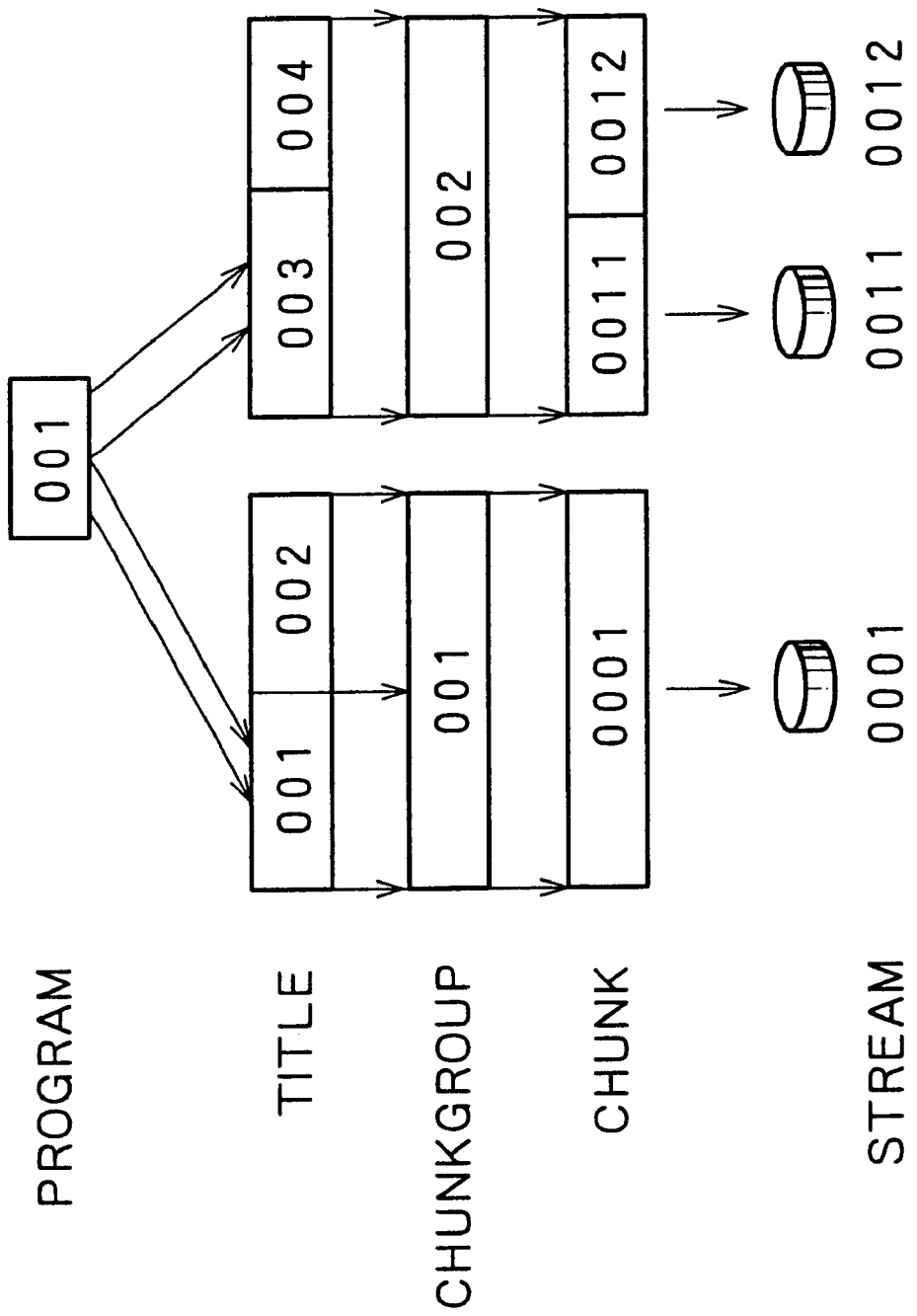

FIG. 36

| field name | value |
|---|---|
| file_type_id | "TITLE_INFO_00000" |

FIG. 37

| mark_type | Meaning |
|---|---|
| 0000b | index type 1 |
| 0001b | index type 2 |
| 0010b .. 0011b | index type 3 .. Index type 8 |
| 1000b | skip IN |
| 1001b | skip OUT |
| 1010b | jump to title end or next title |
| 1011b | scene change |
| 1100b | audio mute |
| 1101b | audio peak |
| 1110b | picture still |
| 1111b | reserved | index:direct entry point in the title
skip IN:start point of title skip
skip OUT:end point of title skip

FIG. 38

| field name | value |
|---|---|
| file_type_id | "CHUNKGROUP_0000" |

FIG. 39

| chunk_sync_play_flag | Meaning |
|---|---|
| 0b | play only one chunk at the same time |
| 1b | need to play chunks simultaneously |

FIG. 40

| original_time_count_type | Meaning |
|---|---|
| 0000 | MPEG2 System time stamp(90kHz) |
| 0001 | SMPTE timecode |
| 0010 | field(525/60)(59.94Hz) |
| 0011 | field(625/50) |
| 0100 | frame(525/60)(29.97Hz) |
| 0101 | frame(625/50) |
| 0110 | drop frame time code (525/60) |
| 0111 | non drop frame time code(525/60) |
| 1000 | 60Hz |
| 1001 | 50Hz |
| 1010 | 24Hz |
| 1011 | second |
| 1100 .. 1111 | reserved |

FIG. 41

| field name | value |
|---|---|
| field_type_id | "STREAM_INFO_0000" |

FIG. 42

| info_type | Meaning |
|---|---|
| 0000 | MPEG2_System_PS |
| 0001 | MPEG2_System_TS |
| 0010 | MPEG2_System_PES |
| 0011 | video_elementary_stream |
| 0100 | elementary_stream_except_video |
| 0101 | MPEG1_System_stream |
| 0110 | reserved |
| 0111 | reserved |
| 1000 | Consumer_DVC |
| 1001 .. 1111 | reserved |

FIG. 43

| slot_unit_type | Meaning |
|---|---|
| 0000b | 'time_stamp' : time stamp value |
| 0001b | 'GOP' : one GOP(Group of pictures) |
| 0010b | 'audio_frame' : one audio frame |
| 0011b .. 1111b | reserved |

FIG. 44

| field name | value |
|---|---|
| file_type_id | "PROGRAM_INFO_000" |

FIG. 45

| program_status | Meaning |
|---|---|
| 0000b | none |
| 0001b | original |
| 0010b | copy |
| 0011b | preview |
| 0100b | rehearsal |
| 0101b | temporary |
| 0110b | complete |
| 0111b | broken |
| 1000b | editing |
| 1001b | backup |
| 1010b .. 1111b | reserved |

FIG. 46

| seamless_connection_flag | value |
|---|---|
| 0b | seamless playback connection with the previous play item is not guaranteed or unknown |
| 1b | seamless playback connection with the previous play item is guaranteed |

RECORDING/REPRODUCING APPARATUS AND METHOD AND PROGRAM OFFERING MEDIUM

BACKGROUND OF THE INVENTION

1. Field of the Invention

The present invention relates to a recording/reproducing apparatus and method and a program offering medium, particularly to a recording/reproducing apparatus and method and a program offering medium restraining what a user erroneously recognizes as a failure in relation to consecutive reproduction of data.

2. Description of the Related Art

There is a case in a disk in which video data or audio data is not only consecutively recorded but also recorded intermittently at intervals of time. Further, there is a case in which data which has once been recorded is erased and other data is overwritten.

There is a case in which when such an erasing or overwriting processing is repeatedly executed, data which is to be consecutively reproduced is not necessarily recorded at consecutive positions on a disk but is recorded at positions separate from each other on the disk. At such an occasion, when a capacity of a buffer in reproduction of an apparatus is not sufficient, there is a case in which data cannot be reproduced consecutively and reproduction data becomes temporarily deficient depending on positions of recording.

However, whether nonconsecutive portions are caused is influenced by the capacity of the buffer of the apparatus and accordingly, compatibility among apparatus cannot be ensured and in the worst case, there is a concern that the user erroneously recognizes that an apparatus is failed.

SUMMARY OF THE INVENTION

The present invention has been carried out in view of such a situation and it is an object of the present invention to ensure compatibility of apparatus and restrain what a user erroneously recognizes as a failure of apparatus.

According to an aspect of the present invention, there is provided a recording apparatus comprising recording means for recording data to a record medium, determining means for determining whether the data can be reproduced consecutive to already recorded data and executing means for executing a processing in respect of consecutive reproduction of the data in correspondence with a result of determination of the determining means.

According to another aspect of the present invention, there is provided a recording method of a recording apparatus, the recording method comprising a recording step for recording data to a record medium, a determining step for determining whether the data can be reproduced consecutive to already recorded data when the data is recorded on the record medium, and an executing step for executing a processing in respect of consecutive reproduction of the data in correspondence with a result of the determination at the determining step.

According to another aspect of the present invention, there is provided a program offering medium offering a program for executing a processing, the processing comprising a recording step for recording data to a record medium, a determining step for determining whether the data can be reproduced consecutive to already recorded data when the data is recorded on the record medium, and an executing step for executing a processing in respect of consecutive reproduction of the data in correspondence with a result of the determination at the determining step to a recording apparatus for recording the data to the record medium.

According to another aspect of the present invention, there is provided a reproducing apparatus comprising reproducing means for reproducing data recorded on a record medium, extracting means for extracting information of consecutive reproduction expressing whether the consecutive reproduction of the data can be executed from the data reproduced by the reproducing means and adding means for adding a gap to the data reproduced by the reproducing means in correspondence with the information of the consecutive reproduction extracted from the extracting means.

According to another aspect of the present invention, there is provided a reproducing method comprising a reproducing step for reproducing data recorded on a record medium, an extracting step for extracting information of consecutive reproduction expressing whether the consecutive reproduction of the data can be executed from the data reproduced at the reproducing step and an adding step for adding a gap to the reproduced data in correspondence with the extracted information of the consecutive reproduction extracted at the extracting step.

According to another aspect of the present invention, there is provided a program offering medium for offering a program executing a processing, the processing comprising a reproducing step for reproducing data recorded on a record medium, an extracting step for extracting information of consecutive reproduction expressing whether the consecutive reproduction of the data can be executed from the data reproduced at the reproducing step and an adding step for adding a gap to the reproduced data in correspondence with the information of the consecutive reproduction extracted at the extracting step to a reproducing apparatus.

According to the recording apparatus, the recording method and the program offering medium specified in the features of the present invention, in correspondence with the result of determination on whether the data can be reproduced consecutive to the already recorded data, the processing in respect of the consecutive reproduction of the data is executed.

According to the reproducing apparatus, the reproducing method and the program offering medium specified in the features of the present invention, in correspondence with the information of the consecutive reproduction reproduced from the record medium, the gap is added to the data.

BRIEF DESCRIPTION OF THE DRAWINGS

FIG. 2 is a diagram for explaining VOLUME.TOC;

FIG. 3 is a diagram for explaining volume_information();

FIG. 4 is a diagram for explaining volume_attribute();

FIG. 5 is a diagram for explaining resume();

FIG. 6 is a diagram for explaining volume_rating();

FIG. 7 is a diagram for explaining write_protect();

FIG. 8 is a diagram for explaining play_protect();

FIG. 9 is a diagram for explaining recording_timer();

FIG. 10 is a diagram for explaining text_block();

FIG. 11 is a diagram for explaining language_set();

FIG. 12 is a diagram for explaining text_item();

FIG. 13 is a diagram for explaining ALBUM.STR;

FIG. 14 is a diagram for explaining album();

FIG. 15 is a diagram for explaining TITLE_###.VDR;

FIG. 16 is a diagram for explaining title_info();

FIG. 17 is a diagram for explaining PROGRAM_$$$.PGI;

FIG. 18 is a diagram for explaining program();

FIG. 19 is a diagram for explaining play_list();

FIG. 20 is a diagram for explaining play_item();

FIG. 21 is a diagram for explaining CHUNKGROUP_###.CGIT;

FIG. 22 is a diagram for explaining chunk_connection_info();

FIG. 23 is a diagram for explaining chunk_arrangement_info();

FIG. 24 is a diagram for explaining CHUNK_%%%%.ABST;

FIG. 25 is a block diagram showing a structure example of an optical disk apparatus to which the present invention is applied;

FIG. 26 is a diagram for explaining a structure of a directory;

FIG. 29 is a diagram for explaining a structure of a directory;

FIG. 30 is a diagram for explaining a structure of a directory;

FIG. 32 is a diagram for explaining a structure of a directory;

FIG. 33 is a diagram for explaining a structure of a directory;

FIG. 34 is a diagram for explaining a logical structure of a directory;

FIG. 35 is a diagram for explaining a logical structure of a directory;

FIG. 36 is a diagram for explaining file_type_id;

FIG. 37 is a diagram for explaining mark_type;

FIG. 38 is a diagram for explaining file_type_id;

FIG. 39 is a diagram for explaining chunk_sync_play_flag;

FIG. 40 is a diagram for explaining original_time_count_type;

FIG. 41 is a diagram for explaining file_type_id;

FIG. 42 is a diagram for explaining info_type;

FIG. 43 is a diagram for explaining slot_unit_type;

FIG. 44 is a diagram for explaining file_type_id;

FIG. 45 is a diagram for explaining program_status;

FIG. 46 is a diagram for explaining seamless_connection_flag;

DETAILED DESCRIPTION OF THE PREFERRED EMBODIMENTS

An explanation will be given of embodiments according to the present invention as follows. In order to clarify corresponding relationships between respective means of the invention specified in the scope of claims and following embodiments, features of the present invention will be described by adding corresponding embodiments (only examples) in parentheses following respective means as follows. However, naturally, such description does not signify that the respective means are limited to the described embodiments.

Figure 48:
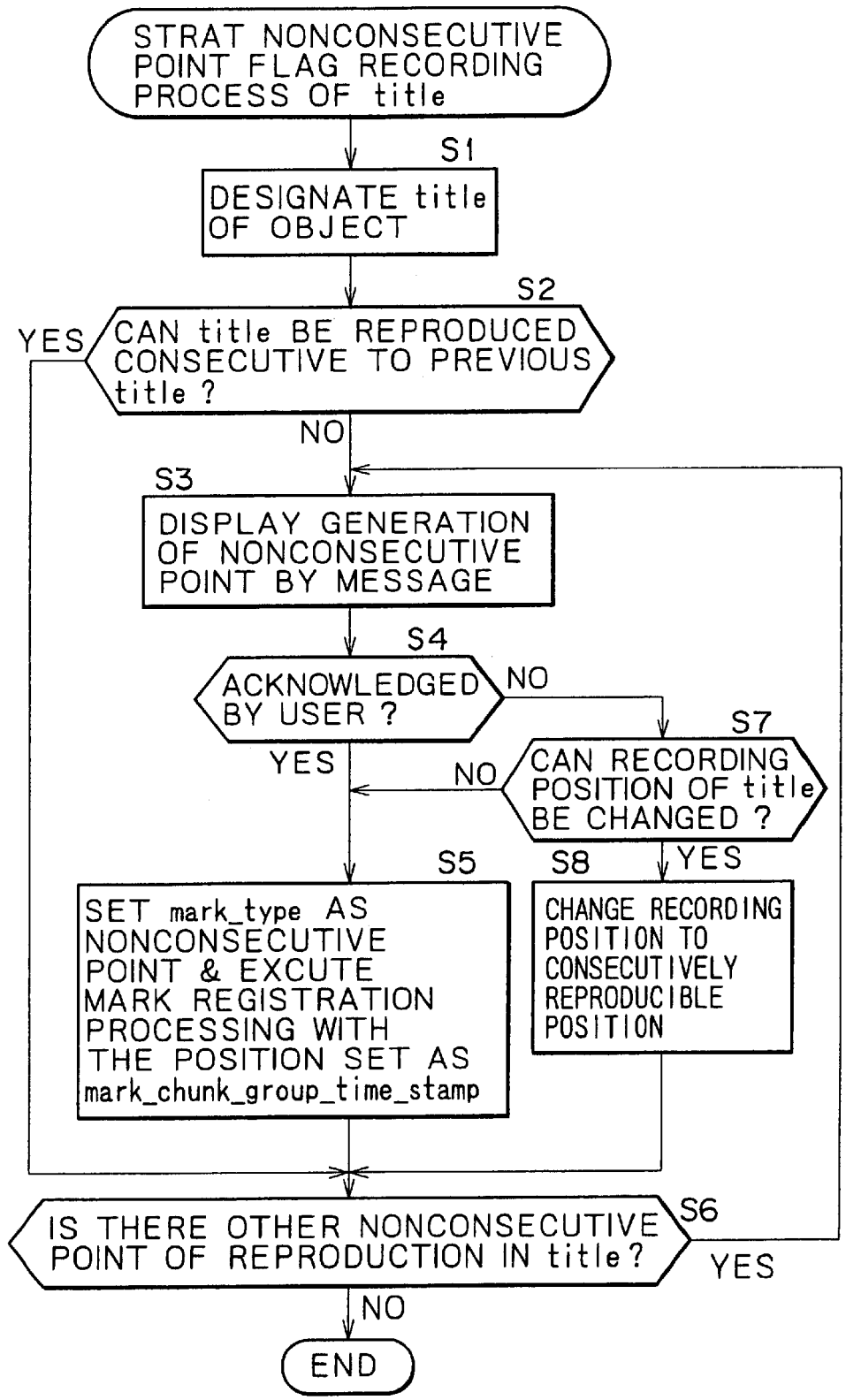
FIG. 48 is a flowchart for explaining a nonconsecutive point flag recording process of title.

A recording apparatus according to an aspect of the present invention is featured in including recording means for recording data to a storage medium (for example, optical head 2 in FIG. 25), determining means for determining that when data is recorded to the storage medium, whether the data can be reproduced consecutive to data which has already been recorded (for example, step S2 of FIG. 48) and executing means for executing a processing in respect of consecutive reproduction of data in correspondence with a result of determination of the determining means (for example, step S5 of FIG. 48).

Figure 50:
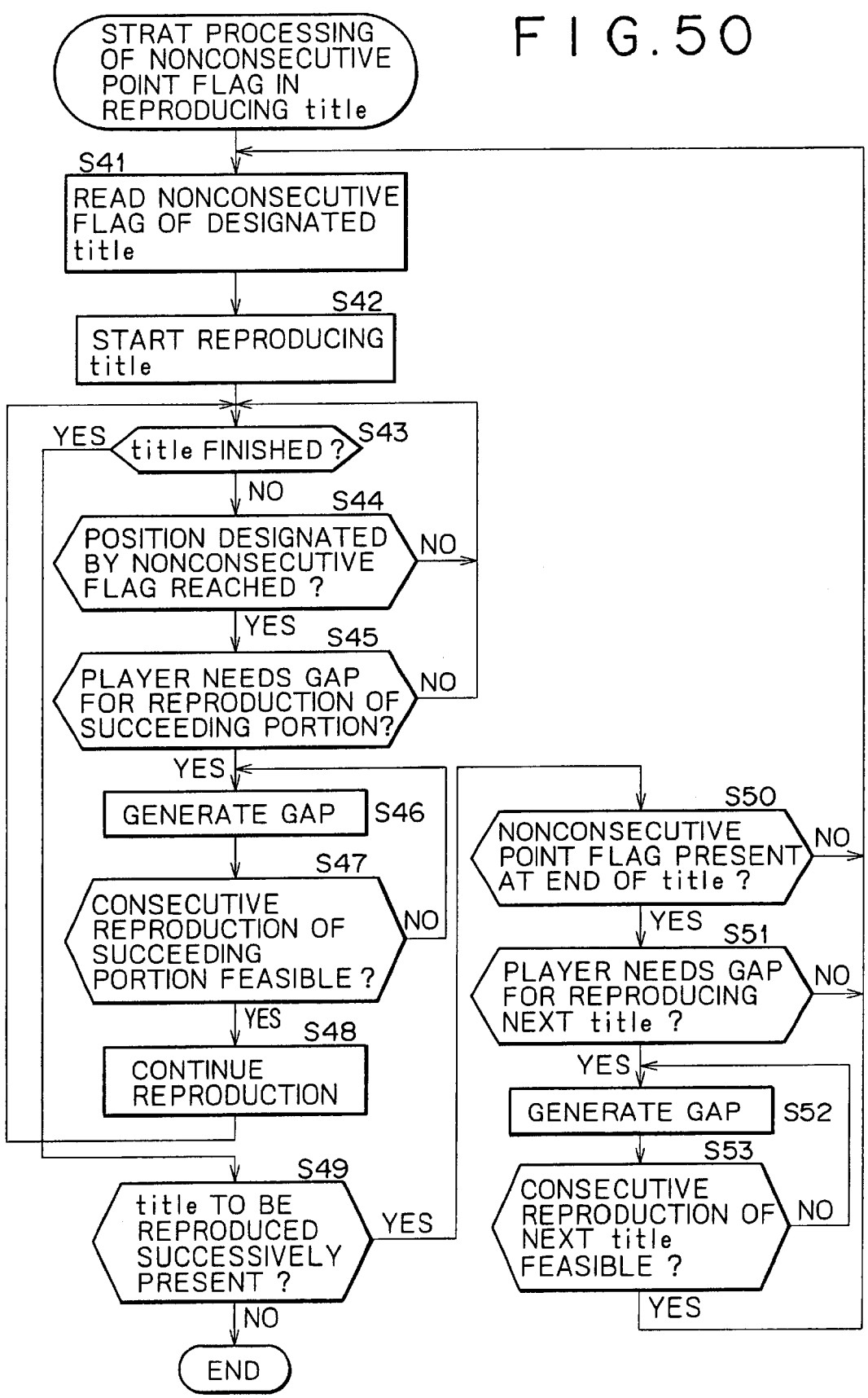
FIG. 50 is a flowchart for explaining a processing of a nonconsecutive point flag in reproducing title.

A reproducing apparatus according to another aspect of the invention is featured in including reproducing means for reproducing data recorded in a storage medium (for example, optical head 2 in FIG. 25), extracting means for extracting consecutive reproduction information indicating whether the data can be reproduced consecutively from the data reproduced by the reproducing means (for example, step 41 in FIG. 50) and adding means for adding a gap to the data reproduced by the reproducing means in correspondence with the consecutive reproduction information extracted by the extracting means (for example, step 46 in FIG. 50).

Figure 1:
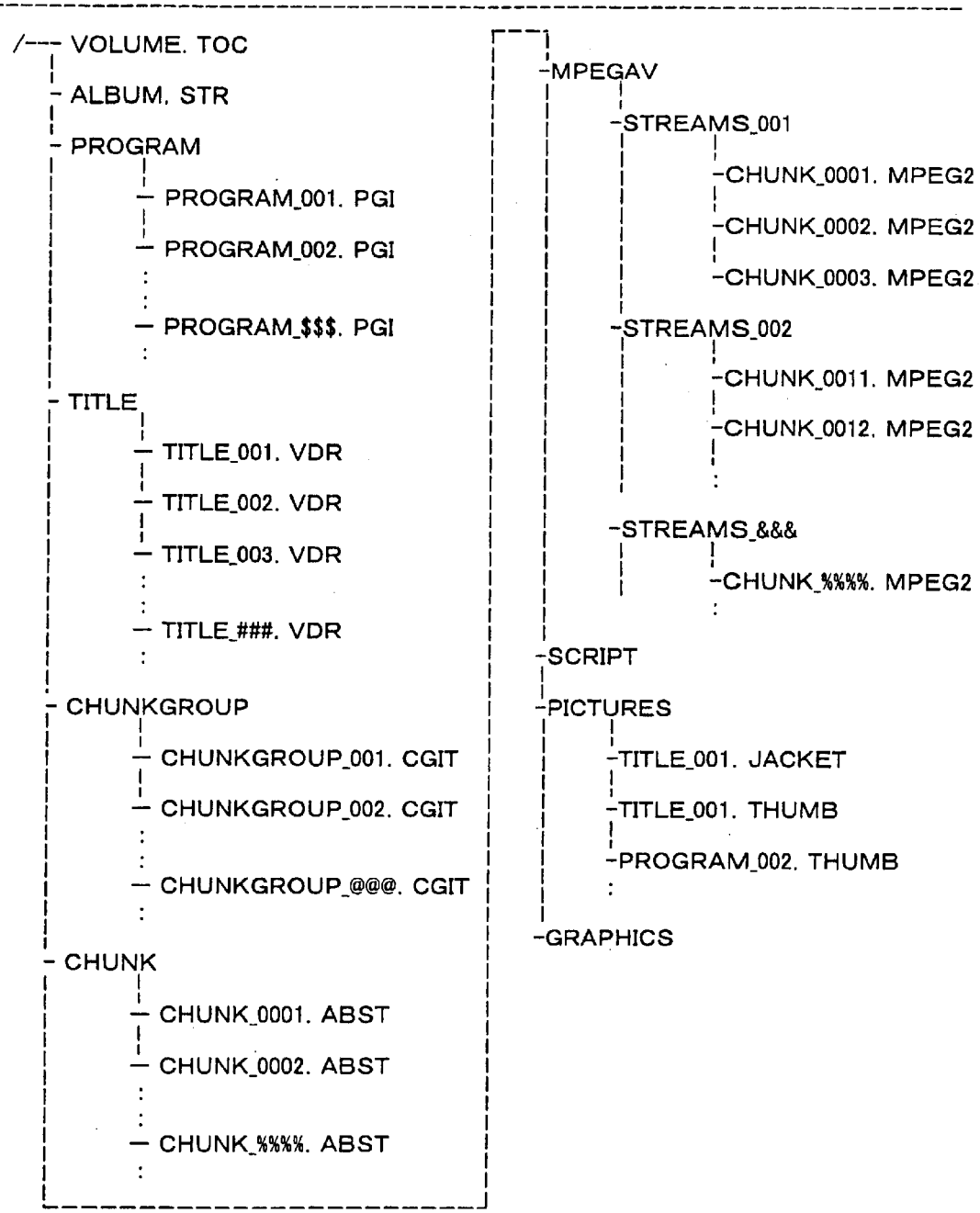
FIG. 1 is a diagram for explaining a format of a directory.

First, an explanation will be given of file allocation on a storage medium to or from which information is recorded or reproduced in the present invention. As shown in FIG. 1, following seven kinds of files are recorded on a medium.

VOLUME.TOC
ALBUM.STR
PROGRAM_$$$.PGI
TITLE_###.VDR
CHUNKGROUP_@@@.CGIT
CHUNK_%%%%.ABST
CHUNK_%%%%.MPEG2

The files VOLUME.TOC and ALBUM.STR are placed in a root directory. Further, "PROGRAM_$$$.PGI" (in this case, "$$$" indicates a program number) is placed in the directory "PROGRAM" just under the root directory. Similarly, "TITLE_###.VDR" (in this case, "###" indicates a title number) is placed in the directory "TITLE" just under the root directory, "CHUNKGROUP_@@@.CGIT" (in this case, "@@@" indicates a chunkgroup number) is placed in the directory "CHUNKGROUP" and "CHUNK_%%%%.ABST" (in this case, "%%%%" indicates a chunk number) is placed in the directory "CHUNK", respectively.

Further, one or more sub-directories are generated to the MPEGAV directory just under the root directory and "CHUNK_%%%%.MPEG2" (in this case, %%%% indicates a chunk number) is placed under the sub-directories.

One file VOLUME.TOC is usually placed on a medium. However, a plurality of files VOLUME.TOC can also be placed in a medium having a special structure such as a medium in a hybrid structure of ROM (Read Only Memory)

and RAM (Random Access Memory). The file is used to indicate the property of a medium as a whole.

The structure of VOLUME.TOC is as shown in FIG. 2. At a leading portion, placed is "file_type_id", which indicates that the relevant file is VOLUME.TOC. Next, "volume_information()" follows and finally, "text_block()" follows.

FIG. 3 shows the structure of "volume_information()". The area includes "volume_attribute()", "resume()", "volume_rating()", "write_protect()", "play_protect()" and "recording_timer()".

The "volume_attribute()" is an area for recording attributes of logical volume and its detailed structure is shown in FIG. 4. As shown in the drawing, the area includes "title_playback_mode_flag", "program_playback_mode_flag" and the like.

The "resume()" is an area for recording information to recover a condition immediately before eject when a medium is re-inserted and its detailed structure is shown in FIG. 5.

"Volume_rating()" in FIG. 3 is an area for recording information to realize a limitation in an age of a viewer in respect of a total of volume in accordance with age and category and its detailed structure is shown in FIG. 6.

"Write_protect()" of FIG. 3 is an area for recording information limiting change and erasing manipulation in respect with title and program recorded in the volume and its detailed structure is shown in FIG. 7.

"Play_protect()" in FIG. 3 is an area for recording information for setting reproduction acknowledgement or limiting a number of times of reproduction in respect of title and program recorded in the volume and its detailed structure is shown in FIG. 8.

"Recording_timer()" in FIG. 3 is an area for recording information for controlling recording time and its detailed structure is shown in FIG. 9.

FIG. 10 shows a detailed structure of the area "text_block()" of the file VOLUME.TOC of FIG. 2. The area "text_block()" includes areas "language_set()" and "text_item" and detailed structures thereof are respectively shown in FIG. 11 and FIG. 12.

Usually, a medium includes only one of the file ALBUM.STR. However, there can exist a plurality of the files in a medium having a special structure such as a medium having a hybrid structure of ROM and RAM. The file is used to construct a constitution in which one medium were formed by combining a plurality of media.

The structure of the file ALBUM.STR is as shown in FIG. 13. "File_type_id" is placed at a leading area, indicating that the relevant file is ALBUM.STR. Next, a file "album()" follows and finally, a file "text_block()" follows.

The file "album()" is an area for recording information to deal with a plurality of volumes (plurality of media) as one aggregation and its detailed structure is shown in FIG. 14.

There exist files of "TITLE_###.VDR of FIG. 1 by a number of titles. A title refers to, for example, a title of a piece of music in a compact disk or a title of a program in television broadcast. The structure of the information is as shown in FIG. 15. An area "file_type_id" is placed at a leading area which indicates that the relevant file is "TITLE_###.VDR". Next, an area "title_info()" follows and finally, an area "textblock()" follows. Notation "###" designates a character string indicating a title number.

The area "title_info()" is an area for recording a start point, an end point and other attribute in respect of a title on the chunkgroup and its detailed structure is shown in FIG. 16.

There exist files of "PROGRAM_$$$.PGI of FIG. 1 by a number of programs. A program is constituted by a plurality of cuts designating a portion (or a total) of an area of a title and respective cuts are reproduced in a designated sequence. The structure of the information is shown in FIG. 17. An area "file_type_id" is placed at a leading area which indicates that the relevant file is "PROGRAM_$$$.GPI". Next, an area "program()" is follows and finally, an area "text_block()" follows. Notation $$$ designates a character string indicating a title number.

The area "program()" is an area for recording information necessary for collecting and reproducing necessary portions of a title without subjecting a material thereof to irreversible edition and its detailed structure is shown in FIG. 18.

The area "program()" of FIG. 18 includes one "play_list". Details of the "play_list()" are shown in FIG. 19.

The area "play_list" includes a plurality of areas "play_item()". Details of the area "play_item()" are shown in FIG. 20.

There exist files of "CHUNKGROUP_@@@.CGIT" of FIG. 1 by a number of chunkgroups. The chunkgroup is a data structure for arranging a bit stream. The file is not recognized by a user so far as the user normally operates an apparatus of recording and reproducing a medium such as VDR (Video disk recorder).

The structure of the information is as shown in FIG. 21. An area "file_type_id" is placed at a leading area which indicates that the relevant file is "CHUNKGROUP_@@@.CGIT". Successive thereto, there are areas "chunkgroup_time_base_flags" and "chunkgroup_time_base_offset", next, an area "chunk_connection_info()" follows and finally an area "text_block()" follows.

The area "chunkgroup_time_base_flags" indicates flags in respect of a standard counter of a chunkgroup and the area "chunkgroup_time_base_offset" indicates start time of a standard time axis in a chunkgroup. This is a value set to a counter counting up in every 90 kHz and is provided with a size of 32 bits. The area "chunk_connection_info()" is an area for storing information of singular points such as a switching point of a video signal or synchronization of video and audio signals and its detailed structure is shown in FIG. 22.

In the area "chunk_connection_info()", loops of areas "chunk_arrangement_info()" are placed by a number of chunks belonging to the chunkgroup. Details of the area "chunk_arrangement_info()" are shown in FIG. 23.

There exist files of "CHUNK_%%%%.ABST" of FIG. 1 by a number of chunks. A chunk indicates an information file in correspondence with one stream file. The structure of the information is as shown in FIG. 24. An area "file_type_id" is placed at a leading area which indicates that the relevant file is "CHUNK_%%%%.ABST".

A file "CHUNK_%%%%.MPEG2 in FIG. 1 is a stream file. The file stores a bit stream of MPEG which differs from other file recording only information.

FIG. 25 shows an example of an constitution of an optical disk apparatus for recording or reproducing information to or from an optical disk as a medium having the files explained above. In this optical disk apparatus, an optical head 2 of one system is installed to one sheet of a programmable optical disk land the optical head 2 is used both for reading and writing data.

A bit stream read from the optical disk 1 by the optical head 2 is demodulated by RF and a demodulating/modulating circuit 3, thereafter subjected to error correction by an ECC circuit 4 and transmitted to a reading channel buffer 6 for absorbing a difference between a reading rate and a decoding rate via a switch 5. The reading channel buffer 6 is constituted to be able to read and write data from and to a system controller 13.

The bit stream outputted from the reading channel buffer 6 is decoded by a decoder 7 from which a video signal and an audio signal are outputted. The video signal outputted from the decoder 7 is inputted to a combining circuit 8, combined with the video signal outputted from an OSD (On Screen Display) control circuit 9, thereafter outputted from an output terminal P1 to a display, not illustrated, and displayed thereon. The audio signal outputted from the decoder 7 is transmitted from an output terminal P2 to a speaker, not illustrated, and reproduced there.

In the meantime, a video signal inputted from an input terminal P3 and an audio signal inputted from an input terminal P4 are encoded by an encoder 10 and thereafter transmitted to a writing channel buffer 11 for absorbing a difference between an encoding rate and a writing rate. The writing channel buffer 11 is also constituted to be able to read and write data from and to the system controller 13.

Data stored in the writing channel buffer 11 is read from the writing channel buffer 11, inputted to the ECC circuit 4 via the switch 5 to be added with an error correction code and thereafter modulated by the demodulating/modulating circuit 3. A signal (RF signal) outputted from RF and the demodulating/modulating circuit 3 is written to the optical disk 1 by the optical head 2.

An address detecting circuit 12 detects address information of a track for recording or reproduction of the optical disk 1. The system controller 13 controls operation of respective portions of the optical disk apparatus and comprises ROM 22 storing processing programs to be executed by CPU 21, RAM 23 for temporarily storing data generated in a processing procedure and RAM 24 for storing a various kinds of information files to be recorded to or reproduced from the optical disk 1. CPU 21 finely adjusts a position of the optical head 2 based on a result of detection of the address detecting circuit 12. Further, CPU 21 carries out switching control of the switch 5. An input unit 14 constituted by various kinds of switches and buttons is manipulated by a user when various commands are inputted.

Next, an explanation will be given of an operation of reading basic information files. For example, in reading the "VOLUME.TOC" information file, CPU 21 of the system controller 13 determines a physical address on the optical disk 1 where the "VOLUME.TOC" is recorded and the length of the file by using a file system manipulation instruction previously built in the processing program. Successively, CPU 21 shifts the optical head 2 based on the address information of the "VOLUME.TOC". Further, CPU 21 sets the optical head 2, RF and the demodulating/modulating circuit 3 and the ECC circuit 4 to the read mode, switches the switch 5 to the side of the reading channel buffer 6, finely adjusts the position of the optical head 2 and starts the reading operation by the optical head 2. Thereby, contents of the "VOLUME.TOC" are read by the optical head 2, demodulated by RF and the demodulating/modulating circuit 3, subjected to error correction by the ECC circuit 4 and accumulated in the reading channel buffer 6.

When an amount of data accumulated in the reading channel buffer 6 becomes equal to or larger than the size of the "VOLUME.TOC", CPU 21 stops the reading operation. Thereafter, CPU 21 reads the relevant data from the reading channel buffer 6 and stores the data to RAM 24.

Next, an explanation will be given of an operation of writing the basic information file with an example of writing the "VOLUME.TOC" information file. CPU 21 uses a file system manipulation instruction previously built in the processing program to search in the file system (optical disk 1) a vacant area having the capacity equal to or larger than the size of the "VOLUME.TOC" to be written and determines the address.

Next, CPU 21 transfers the "VOLUME.TOC" prepared in RAM 24 to be newly written to the writing channel buffer 11. Successively, CPU 21 shifts the optical head 2 to the writing position based on the address information of the vacant area. Further, CPU 21 sets the optical head 2, RF and the demodulating/modulating circuit 3 and the ECC circuit 4 to the write mode, switches the switch 5 to the side of the writing channel buffer 11, finely adjusts the position of the optical head 2 and thereafter starts the writing operation by the optical head 2.

Thereby, contents of the newly prepared "VOLUME.TOC" are read from the writing channel buffer 11, inputted to the ECC circuit 4 via the switch 5 to thereby add with an error correction code and thereafter, modulated by RF and the demodulating/modulating circuit 3. A signal outputted from RF and the demodulating/modulating circuit 3 is recorded to the optical disk 1 by the optical head 2. When an amount of data read from the writing channel buffer 11 and recorded to the optical disk 1 becomes equal to the size of the "VOLUME.TOC", CPU 21 stops the writing operation.

Finally, CPU 21 rewrites a pointer indicating the "VOLUME.TOC" in the file system (optical disk 1) to indicate a newly written position by using a file system manipulating instruction previously built in the processing program.

Next, an explanation will be given of the basic stream reproducing operation with an example of reproducing a stream of "CHUNK_0001.MPEG2" of FIG. 1. CPU 21 determines a physical address of "CHUNK_0001.MPEG2" recorded on the optical disk 1 and the length of the file by using a file system manipulating instruction previously built in the processing program. Successively, CPU 21 shifts the optical head 2 to the read position based on the address information of "CHUNK_0001.MPEG2". Further, CPU 21 sets the optical head 2, RF and the demodulating/modulating circuit 3 and the ECC circuit 4 to the read mode, switches the switch 5 to the side of the reading channel buffer 6, finely adjusts the position of the optical head 2 and thereafter starts the reading operation by the optical head 2.

Contents of the "CHUNK_0001.MPEG2" read by the optical head 2 are accumulated in the reading channel buffer 6 via RF and the demodulating/modulating circuit 3, the ECC circuit 4 and the switch 5. Data accumulated in the reading channel buffer 6 is outputted to the decoder 7 to be subjected to the decoding process by which a video signal and an audio signal are respectively outputted. The audio signal is outputted from the output terminal P2 and the video signal is outputted from the output terminal P1 via the combining circuit 8.

When an amount of data read from the optical disk 1, decoded and displayed becomes equal to the size of the "CHUNK_0001.MPEG2", or when stoppage of the reading operation is instructed from the input unit 14, CPU 21 stops the reading and decoding processes.

Next, an explanation will be given of the basic stream recording operation with an example of writing the "CHUNK_0001.MPEG2" information file. CPU 21 searches a vacant area having a size equal to or larger than that of the "CHUNK_0001.MPEG2" to be written in the file system (optical disk 1) by using a file system manipulation instruction previously integrated to the processing program and determines the address.

A video signal inputted form the input terminal P3 and an audio signal inputted from the input terminal P4 are encoded by the encoder 10 and thereafter accumulated in the writing channel buffer 11. Successively, CPU 21 shifts the optical head 2 to the writing position based on the address information of the vacant area. Further, CPU 21 sets the optical head, RF and the demodulating/modulating circuit 3 and the ECC circuit 4 to the write mode, switches the switch 5 to the side of the writing channel buffer 11, finely adjusts the position of the optical head 2 and thereafter starts the writing operation by the optical head 2. Thereby, contents of the newly prepared "CHUNK_0001.MPEG2" are read from the writing channel buffer 11, inputted to the optical head 2 via the switch 5, the ECC circuit 4 and RF and the demodulating/modulating circuit 3 and recorded on the optical disk 1.

When an amount of data read from the writing channel buffer 11 and recorded to the optical disk 1 becomes equal to a previously set value, or when stoppage of the writing operation is instructed from the input unit 14, CPU 21 stops the writing operation. Finally, CPU 21 rewrites a pointer indicating "CHUNK_0001.MPEG2" in the file system (optical disk 1) to indicate the newly written position by using a file system manipulating instruction previously built in the processing program.

Now, assume that information files and stream files as shown in FIG. 26 are recorded in the optical disk 1. According to the example, one program file referred to as "PROGRAM_001.PGI" is included. Further, the optical disk 1 includes files of three titles referred to as "TITLE_001.VDR", "TITLE_002.VDR" and "TITLE_003.VDR". Further, the optical disk 1 also includes files of three streams referred to as "CHUNK_0001.MPEG2", "CHUNK_0011.MPEG2" and "CHUNK_0012.MPEG2" and is placed with three information files of "CHUNK_0001.ABST", "CHUNK_0011.ABST" and "CHUNK_0012.ABST" as information corresponding therewith.

Figure 27:
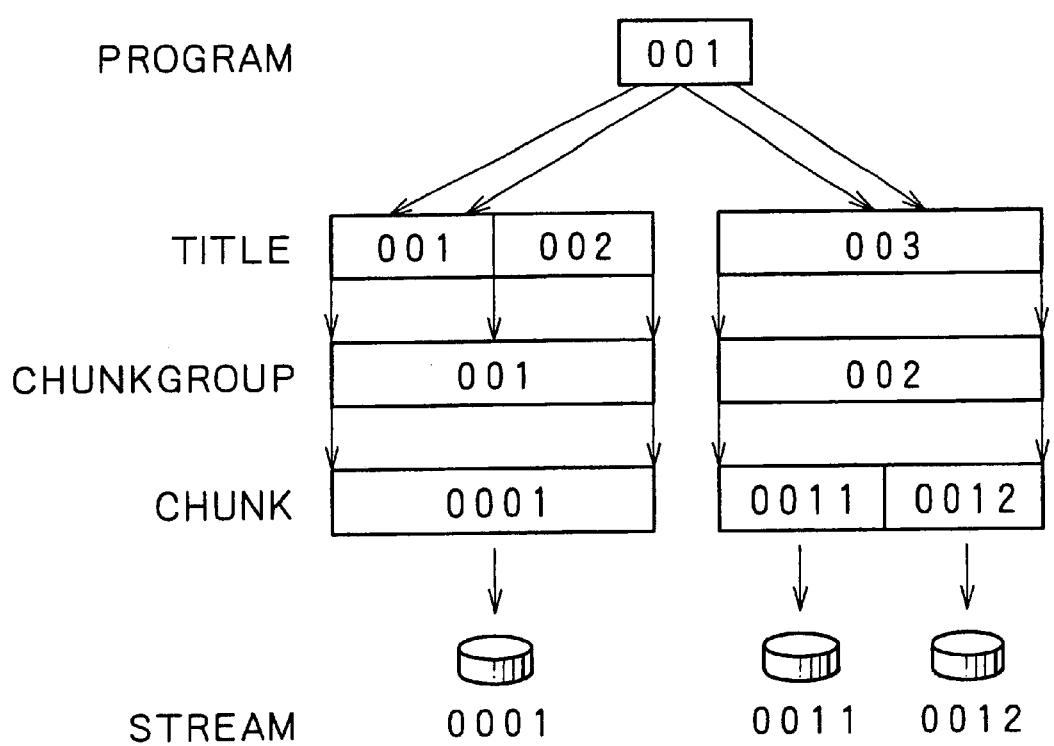
FIG. 27 is a diagram for explaining a logical structure of a directory.

FIG. 27 shows the logical structure of the optical disk 1 having the information files and the stream files shown in FIG. 26. According to the example, the chunk information file "CHUNK_001.ABST" designates the stream file "CHUNK_0001.MPEG2", the chunk information file "CHUNK_0011.ABST" designates the stream file "CHUNK_0011.MPEG2" and the chunk information file "CHUNK_0012.ABST" designates the stream file "CHUNK_0012.MPEG2", respectively. Specifically, a file ID of a stream is designated in a field referred to as "chunk_file_id" in the "CHUNK_%%%%.ABST" of FIG. 24. _Further, according to the example, the chunkgroup information file "CHUNKGROUP_001.CGIT" designates the chunk information file "CHUNK_0001.ABST" and the chunkgroup information file "CHUNK_002.CGIT" designates the chunk information files "CHUNK_0011.ABST" and "CHUNK_0012.ABST", respectively. Specifically, file IDs of chunk information are designated in a field referred to as chunk_info_file_id in "chunk_arrangement_info()" of FIG. 23. The chunk_arrangement_info() has a data structure to be provided in the chunkgroup information file and to exist by a number of chunks belonging to the relevant chunkgroup (chunk_arrangement_info() of FIG. 23 is described in chunk_connection_info() of FIG. 22 and the chunk_connection_info() is described in CHUNKGROUP_###.CGIT OF FIG. 21).

CHUNKGROUP_001 includes only one chunk_arrangement_info() and chunk_info_file_id in the field designates CHUNK_0001. CHUNKGROUP_002 includes two fields of chunk_arrangement_info() in which CHUNK_0011 and CHUNK_0012 are designated, respectively. In view of such a case, the chunkgroup can designate a reproduction sequence of a plurality of chunks.

Specifically, an initial value of a clock of the relevant chunkgroup is determined by chunkgroup_time_base_offset of the CHUNKGROUP_###.CGIT of FIG. 21. Next, in registering respective chunks, presentation_start_cg_count and presentation_end_eg_time_count of chunk_arrangement_info() of FIG. 23 are designated.

Figure 28:
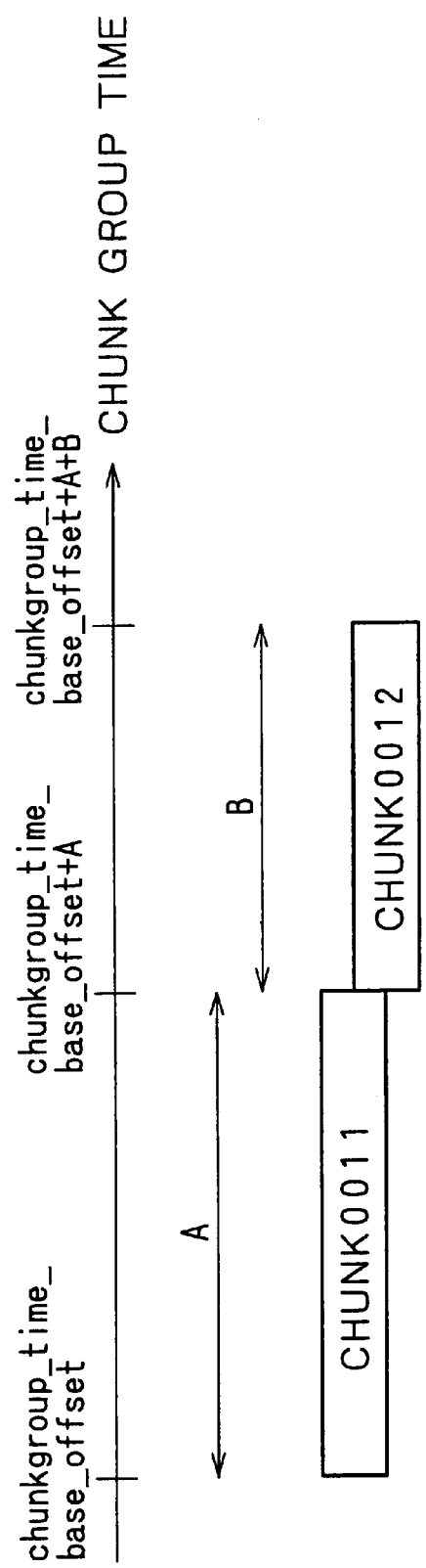
FIG. 28 is a diagram for explaining offset.

For example, as shown in FIG. 28, length (time) of CHUNK_0011 is designated by notation A and length (time) of CHUNK_0012 is designated by notation B. The field presentation_start_cg_count of CHUNK_0011 is equal to chunkgroup_time_base_offset and the field presentation_end_cg_count is equal to chunkgroup_time_base_offset+A. Further, the field presentation_start_cg_count of CHUNK_0012 is equal to chunkgroup_time_base_offset+A and presentation_end_cg_count is equal to "chunk_group_time_base_offset+A+B". By setting in this way, CHUNKGROUP_002 is defined as consecutively reproducing CHUNK_0011 and CHUNK_0012.

Further, when reproduction times of CHUNK_0011 and CHUNK_0012 overlap, the fields can be designated by shifting times in such a way. Further, special effects (fade in, fade out, wipe etc.) can be designated in a transition between two streams by making description in transition_info() in the chunk_arrangement_info() of FIG. 23.

In the example of FIG. 26 (FIG. 27), title information files "TITLE_001.VDR" and "TITLE_002.VDR" designate the chunkgroup information file "CHUNKGROUP_001.CGIT" and a title information file "TITLE_003.VDR" designates the chunkgroup information file 'CHUNKGROUP_002.CGIT", respectively. Specifically, in a field referred to as cgit_file_id in the title_info() of FIG. 16, a file ID of a chunkgroup is designated and in fields of title_start_chunk_group_time_stamp and title_end_chunk_group_time_stamp, a range of time in which a relevant title is defined in the chunkgroup is designated.

For example, according to the example of FIG. 27, TITLE_001 designates a former half of CHUNKGROUP_001 and TITLE_002 designates a latter half thereof respectively. Further, division is carried out in accordance with a request from a user, the position is arbitrary for the user and such position cannot be determined previously. In this case, assume that the dividing position by TITLE_001_ and TITLE_002 is set to a position remote from a leading area of CHUNKGROUP_001 by A.

TITLE_001 designates CHUNKGROUP_001 as a chunkgroup, designates start time of CHUNKGROUP_001 as start time of the title and designates time of a point designated by the user as end time of the title.

That is, chunkgroup_time_base_offset (leading position) of CHUNKGROUP_001 is set as title_start_chunk_group_time_stamp of TITLE_001 and chunkgroup_time_base_offset of the CHUNKGROUP_001 added with the length of A is set as title_end_chunk_group_time_stamp of TITLE_001.

Further, TITLE_002 designates CHUNKGROUP_001 as a chunkgroup, designates time of a point designated by the user as start time of the title and designates end time of the CHUNKGROUP_001 as end time of the title.

That is, as the title_start_chunk_group time_stamp of TITLE_002, chunkgroup_time_base_offset (leading position) of CHUNKGROUP_001 added with the length of A is set and as title_end_chunk_group_time_stamp of TITLE_002, chunkgroup_time_base_offset of CHUNKGROUP_001 added with the length of CHUNKGROUP_001 is set.

Further, TITLE_003 designates CHUNKGROUP_002 as a chunkgroup, designates start time of CHUNKGROUP_

002 as start time of the title and designates end time of CHUNKGROUP_002 as end time of the title.

That is, as title_start_chunk_group_time_stamp of TITLE_003, chunkgroup_time_base_offset of CHUNKGROUP_002 is and as title_end_chunk_group_time_stamp of TITLE_003, chunkgroup_time_base_offset of CHUNKGROUP_002 added with the length of CHUNKGROUP_002 is set.

Further, according to the example, a program information file "PROGRAM_001.PGI" designates a portion of TITLE_001 and a portion of TITLE_003 to reproduce in this sequence. Specifically, one cut can be extracted by designating the title by title_number in play_item() of FIG. 20 and defining a start point and an end point by times defined by each title. A program can be constituted by collecting a plurality of such cuts.

Next, an explanation will be given of an operation of additionally recording new information (append recording) to the optical disk 1. Specifically, the recording is carried out, for example, by timer recording or when the user instructs recording in real time to the optical disk apparatus by operating the input unit 14. In the latter case, although when a recording button is pushed, recording end time cannot be predicted, when a button of single-action recording function (function of executing recording for a constant period of time after operating the button) is pushed, the end time can be predicted.

In this case, an explanation will be given of an example of timer recording. In this case, assume that a user of the optical disk apparatus has previously designated recording start time, recording end time, a bit rate of a bit stream, a channel for carrying out recording and soon. Further, assume that it has previously been recognized that vacant capacity in compliance with the bit rate and the recording time remains in the optical disk 1 when recording is reserved.

When further recording is carried out on the optical disk 1 at an intermediary between when the recording is reserved and when the reserved recording is executed, there is a case in which a capacity of an amount of recording a program reserved currently cannot be secured by the designated bit rate. In such a case, CPU 21 reduces the bit rate from the designated value and records information of reserved time period or records the information by a recordable time period while the bit rate remains as it is. In this case, when the further recording is carried out and an adverse situation is produced in the reserved recording, CPU 21 naturally issues a message stating the situation to the user.

Now, when start time of reserved recording gets close, CPU 21 automatically recovers the mode from sleep mode to operation mode by using a built-in timer or clock. Further, CPU 21 uses a file system manipulating instruction previously built in a processing program and secures an area capable of recording a reserved program on the optical disk. That is, a numerical value of a result of subtracting start time from end time of reserved recording (recording time) multiplied by a bit rate is size of an area necessary for recording the reserved program and CPU 21 firstly secures the size of an area. Other than the above-described operation, in the recording operation, when an information file other than the stream file needs to record, in the case where, for example, a title information or the like is necessary for registering a new title, a capacity capable of recording the information file needs to secure in the optical disk 1. When an area of a necessary amount cannot be secured, it is dealt with by the above-mentioned method (method of changing the bit rate, recording only within a recordable time period or the like).

Further, in this case, the operation concerns recording under a new title and accordingly, the user designates a file name of a new stream file as a new stream file of a new stream directory. In this case, the file name is designated as ¥MPEGAV¥STREAMS_003¥CHUNK_0031. That is, as shown in FIG. 29, it is a file having a name of CHUNK_0031.MPEG2 under a directory STREAM_003 under the directory MPEGAV under the root directory.

CPU 21 instructs execution of recording mode to respective portions. For example, a video signal inputted to the input terminal P3 and an audio signal inputted to the input terminal P4 from a tuner, not illustrated are encoded by the encoder 10 and thereafter accumulated in the writing channel buffer 11. Successively, CPU 21 moves the optical head 2 to a writing position based on the address information of the area secured beforehand. Further, CPU 21 sets the optical head 2, RF and the demodulating/modulating circuit 3 and the ECC circuit 4 to the write mode, switches the switch 5 to the side of the writing channel buffer 11, finely adjusts the position of the optical head 2 and thereafter, starts writing by the optical head 2. Thereby, contents of the newly prepared "CHUNK_0031.MPEG2" is read from the writing channel buffer 11 and is recorded on the optical disk 1 via the switch 5, the ECC circuit 4, RF and the demodulating/modulating circuit 3 and the optical head 2.

When the above-described writing operation is continued and any one of the following conditions is caused, CPU 21 stops the writing operation.

1) When end time of reserved recording is reached:
2) When recording to the optical disk 1 cannot be carried out owing to a deficiency in the capacity or other causes:
3) When stoppage of recording operation is instructed:

Next, CPU 21 rewrites a pointer designating "CHUNK_0031.Mpeg2" in the file system to a value indicating a newly written position by using a file system manipulation instruction previously built in the processing program. Further, CPU 21 prepares respective files of chunk information, chunkgroup information and title information and records data by designating suitable names. Further, a vacant capacity capable of recording these files needs to secure on the optical disk 1 in recording or reserving operation.

In this way, new information files are formed as shown by, for example, FIG. 30. In FIG. 30, newly formed current files are attached with asterisk marks (*) at upper right portions of the file names.

Figure 31:
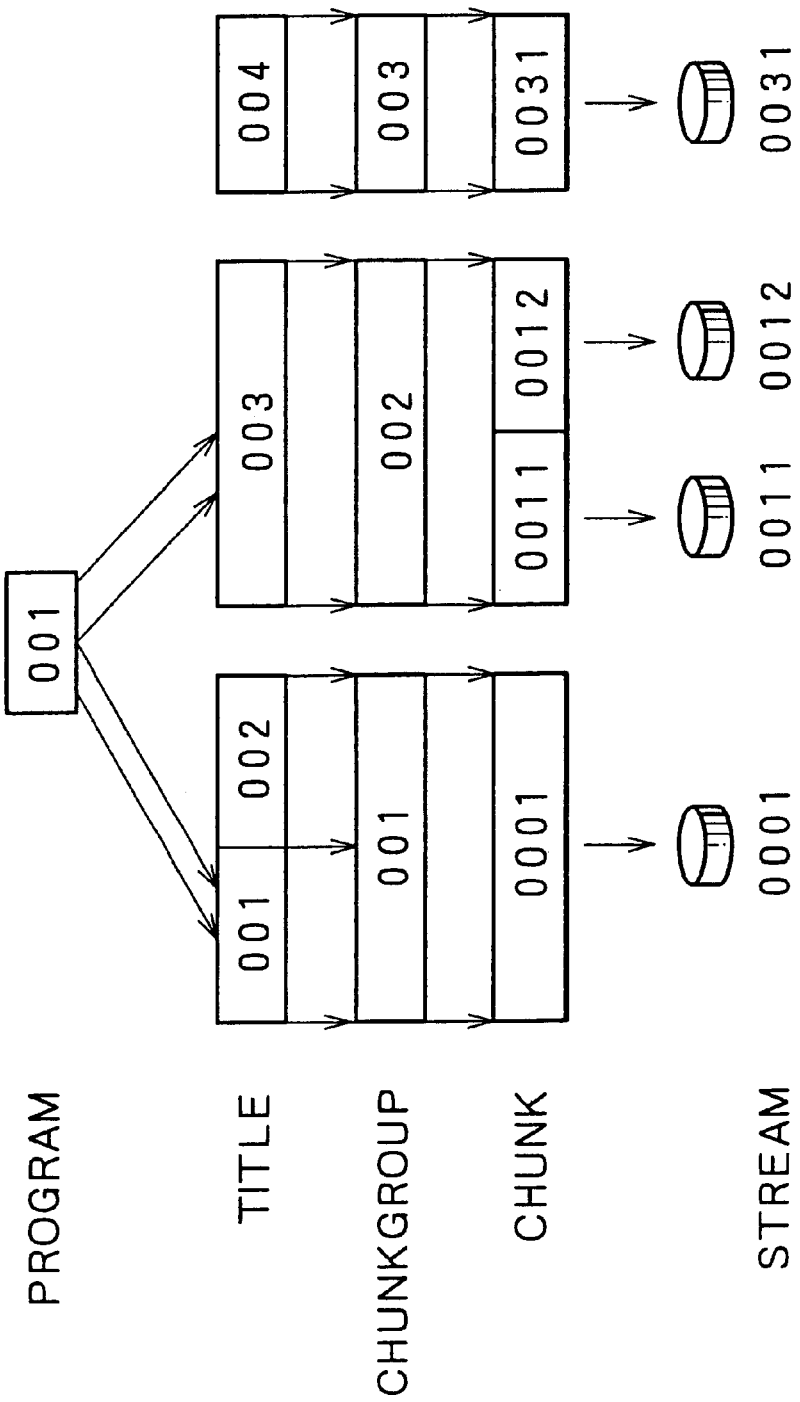
FIG. 31 is a diagram for explaining a logical structure of a directory.

FIG. 31 shows a relationship among the newly formed information files. TITLE_004 designates CHUNKGROUP_003, CHUNKGROUP_003 designates CHUNK_0031 and CHUNK_0031 designates STREAM_0031.

That is, a new stream is registered to the information file as TITLE_004. The user can be informed of attributes or the like of TITLE_004 by the function of the optical disk apparatus for confirming the title and further, TITLE_004 can be reproduced.

Next, an explanation will be given of an operation when overwriting is carried out on the optical disk 1 exemplified in FIG. 26 (FIG. 27). Overwriting refers to an operation of recording a new program on a program which has already been recorded (by erasing the program) similar to the case of recording signals on a video tape.

In overwriting, it is important to define a position of starting to overwrite. For example, assume that a user designates to start overwriting from a leading area of TITLE_001. In this case, overwriting is carried out by rewriting TITLE_001, TITLE_002 and TITLE_003 successively in this order. When the recording operation is not finished even after rewriting is carried out to a final area of TITLE_003, the recording operation is continued by securing a new area in a vacant area on the optical disk 1. For example, when TITLE_002 defines the record start position, TITLE_001 is not rewritten by the current recording operation since it is disposed to precede the record start position.

Now, assume that overwriting operation is carried out by timer recording from the leading area of TITLE_003. In this case, the user of the optical disk apparatus designates beforehand stat time and end time of recording, a bit rate of a bit stream, a channel for carrying out recording and so on. Further, assume that the record start position which is important in overwriting is designated at the leading area of TITLE_003. Further, assume that also in this case, when recording is reserved, a capacity compatible with the bit rate and the record time period has previously been confirmed to exist on the optical disk 1. In the case of overwriting, a sum of a total capacity of (a plurality of) titles which can be overwritten from a designated position and a vacant capacity of the optical disk 1 constitutes a recordable capacity. That is, in the current case, a sum of a total capacity of streams STREAM_0011 and STREAM_0012 controlled by TITLE_003 and a vacant capacity on the optical disk 1 constitutes a recordable capacity.

In overwriting, there are choices of in what order actual recording is to be executed in respect of an amount of a recordable capacity. First, there is considered a first method of recording in the order of streams designated by titles. That is, in the current case, it is a method in which recording is firstly started from a leading area of STREAM_0011 and when recording has been carried out until an end of STREAM_0011, the recording is continued from a leading area of STREAM_0012 and when recording is carried out until an end of STREAM_0012, the recording is carried out in a vacant area. Another method is a method in which recording is carried out firstly at a vacant area and when the vacant area expires, the recording is carried out on existing streams.

The former method is excellent in a sense of emulation of a video tape. That is, the method is featured in that it is easy to understand by the user in the sense of operation similar to that of a video tape. The latter method is featured in that it is excellent in view of protecting recorded data since erasure of already recorded streams is carried out later.

Further, when further recording is carried out on the optical disk 1 at an intermediary between when recording is reserved and when reversed recording is carried out, there is a case in which a capacity of an amount of recording a currently reserved program by a designated bit rate cannot be secured. In such a case, similar to the above-described case, when reservation is executed, the bit rate is automatically reduced and recording is carried out by an amount of a reserved time period or recording is carried out only by a recordable time period while the bit rate remains as it is.

When start time of the reserved recording gets close, the optical disk apparatus recovers from the sleep mode to the operation mode. CPU 21 secures all of the vacant capacity on the optical disk 1. Naturally, although there is a method in which the vacant capacity is not secured at the time point but is secured at a time point where it is necessary, in this case, for the sake of explanation, assume that a necessary area is secured for starting recording operation.

Further, when the size of a necessary area has already been known since start time, finish time and a bit rate are designated as in timer recording, the capacity may be secured by a necessary amount (or an amount added with some margin). In the recording operation, when information files need to record, for example, when title information files are needed for registering the files as new titles, it is necessary that a capacity capable of recording the information files remains.

In this case, assume that a file name is given to a new stream file as a new stream file of a new stream directory. That is, in this case, the file name is designated as ¥MPEGAV¥STREAMS_002¥CHUNK_0031. That is, as shown in FIG. 32, there is formed a file with a name of CHUNK_0031.MPEG2 under STREAM_002 directory under MPEGAV directory under the root directory.

A video signal inputted to the input terminal P3 and an audio signal inputted to the input terminal P4 are encoded by the encoder 10 and thereafter, accumulated in the writing channel buffer 11. Successively, CPU 21 moves the optical head 2 to a writing position based on the address information of an area secured previously. Further, CPU 21 sets the optical head 2, RF and the demodulating/modulating circuit 3 and the ECC circuit 4 to the write mode, switches the switch 5 to the side of the writing channel buffer 11, finely adjusts the position of the optical head 2 and thereafter, makes the optical head 2 to start writing operation. Thereby, contents of the newly prepared "CHUNK_0031.MPEG2" are read from the optical channel buffer 11 and are recorded on the optical disk 1 via the switch 5, the ECC circuit 4, RF and the demodulating/modulating circuit 3 and the optical head 2.

At this occasion, the stream file "CHUNK_001.MPEG2" is firstly rewritten. Further, when the recording operation has been carried out up to the final area of "CHUNK_0011.MPEG2", the recording operation is continued in respect of "CHUNK_0012.MPEG2" and further, "CHUNK_0031.MPEG2".

When the above-described operation is continued and any of the three conditions is caused as in the case mentioned above, CPU 21 stops the writing operation.

Next, CPU 21 updates stream files, chunk information, chunkgroup information and title information by using a file system manipulation instruction previously built in the processing program.

Incidentally, the structure of files is changed depending on a timing at which the writing operation is finished. For example, in the case in which after overwriting has been carried out on two streams of CHUNK_0011.MPEG2 and CHUNK_0012.MPEG2, the recording is carried out on CHUNK_0031.MPEG2, the structure of the files of the optical disk 1 is as shown in FIG. 33. Files currently formed newly are attached with asterisks (*) on upper right portions of the file names.

FIG. 34 shows a relationship among files (files of FIG. 33) newly formed in this way. As is apparent by comparing with FIG. 31, CHUNK_0031 is included as a chunk included in CHUNKGROUP_002 designated by TITLE_003 and CHUNK_0031 designates STREAM_0031.

In the meantime, when the overwriting operation is finished in the midst of overwriting on an existing stream, for example, when overwriting operation is finished in the midst of recording on CHUNK_0011, the stream CHUNK_0031 secured for overwriting is not overwritten and accordingly, it is released. In this case, special title processing is carried out. That is, when overwriting operation has been started from a front area of TITLE_003 and the recording operation is finished at a midway, the title is divided there. That is, as shown in FIG. 35, a field from a start position to an end position of overwriting operation is designated by new TITLE_003 and a subsequent portion (a remaining portion of original TITLE_003) is designated by TITLE_004.

Next, an explanation will be given of an operation of reproducing a file. Now, assume that the optical disk 1 having files shown in FIG. 26 is inserted into the optical disk apparatus and titles are reproduced. First, when the optical disk 1 is loaded, CPU 21 reads information files from the optical disk 1 and stores them to RAM 24. The operation is carried out by repeating the operation of reading basic information files, mentioned above.

First, CPU 21 reads VOLUME_TOC and ALBUM.STR. Next, CPU 21 searches how many files having extensions of "VDR" are present in the field under the directory "TITLE". The files having the extensions are files having information of titles and a number of the files is equal to a number of the titles. According to the example of FIG. 26, a number of titles is 3. Next, CPU 21 reads the three title information files and stores them to RAM 24.

CPU 21 controls the OSD control circuit 9 to generate character information indicating the title information recorded on the optical disk 1, mixes it with the video signal by the combining circuit 8, and outputs the signal from the output terminal P1 to a display. In this case, three titles and sizes and attributes of the respectives (names, time and date of recording or the like) are displayed.

In this case, assume that the user designates reproduction of, for example, TITLE_002. An information file of TITLE_002 (cgit_file_id in title_info() of FIG. 16) is recorded with a file ID designating CHUNKGROUP_001 and CPU 21 records the file ID and stores it and stores CHUNKGROUP_001 to RAM 24.

Next, CPU 21 searches to which CHUNK start time and end time of TITLE_002 (title_start_chunk_group_time_stamp and title_end_chunk_group_time_stamp in title_info() of FIG. 16) correspond. This is carried out by comparing information (presentation_start_cg_time_count and presentation_end_cg_time_count in chunk_arrangement_info() of FIG. 23) to which respective CHUNKs are registered among information of CHUNK-GROUP. In this case, as shown in FIG. 27, it is known that the start time of TITLE_002 is disposed at a midway of CHUNK_0001. That is, it is understood that TITLE_002 can be reproduced from a leading area by starting reproduction from the midway of a stream file "CHUNK_0001.MPEG2".

Next, CPU 21 searches where is the leading area of TITLE_002 in the stream. That is, it is calculated when is the start time of TITLE_002 as offset time of the stream (time stamp), successively, a reproduction start point immediately before the start time is specified by using characteristic point information in the CHUNK file. Thereby, the offset distance of the reproduction start time from the leading area of file can be determined.

Next, CPU 21 determines the physical address and the size on the optical disk 1 at which "CHUNK_0001.MPEG2" is recorded by using a file system manipulation instruction previously built in the processing program. Further, the offset address of the reproduction start point previously calculated is added to this address and the address of the reproduction start point of TITLE_002 is finally determined.

Successively, CPU 21 moves the optical head 2 to the leading position based on the address information of the "CHUNK_0001.MPEG2". Further, CPU 21 sets the optical head 2, RF and the demodulating/modulating circuit 3 and the ECC circuit 4 to the read mode, switches the switch 5 to the side of the reading channel buffer 6, finely adjusts the position of the optical head 2 and makes the optical head 2 to start reading operation. Thereby, contents "CHUNK_0001.MPEG2" are accumulated in the reading channel buffer 6.

Data accumulated in the reading channel buffer 6 is outputted to the decoder 7 and subjected to decoding processing and a video signal and an audio signal are outputted. When an amount of displayed data becomes equal to the size of "CHUNK_0001.MPEG2", CPU 21 proceeds to reproduction of TITLE_003. Reproducing operation of TITLE_003 is similar to the reproducing operation of TITLE_002.

When reproduction of registered titles is finished, or when stoppage of the reading operation is instructed, the reading and decoding processes are stopped.

Further, when a new disk is loaded to the optical disk apparatus as the optical disk 1 or when a disk of different format is loaded, CPU 21 intends to read VOLUME.TOC and ALBUM.STR when the disk is loaded, however, no such files are present in these disks. In such a case, that is, when VOLUME.TOC and ALBUM.STR cannot be read, CPU 21 outputs a message to obtain an instruction from the user. The user issues an instruction to CPU 21 to eject the optical disk 1 (for example, when a disk of different format is loaded) or to initialize the disk (for example, when a new disk of the same format is loaded) or to recover the data by a certain method (for example, when a disk of the same format is loaded but data is destroyed).

Next, a further explanation will be given of title. As shown in FIG. 15, the file TITLE_###.VDR is a file for storing information of title. Information in respect of one title is recorded in one title_info(). A number of title_info() present in TITLE_###.VDR is one. Accordingly, TITLE_###.VDR's exist by a number of titles in the volume.

Title number is not defined in title_info() of FIG. 16 but determined by file name or file id. Accordingly, positive integer ### in TITLE_###.VDR represents title number. Title does not indicate a structure but a range from a title index indicating start point to title index indicating a leading area of a successive title attached to a chunkgroup or a portion of a range up to the end point of a chunkgroup.

The file_type_id of TITLE_###.VDR of FIG. 15 is an id indicating a file recorded with title_info() as shown in FIG. 36 and expressed by a character string having the size of 16. A file text_block() is an area for storing various texts and only text item which is permitted to use in the text_block() is described.

As shown in FIG. 16, title_info() is an area in which _start point and end point of title and other attributes in respect with other title are written on the chunkgroup. Further, file title_info() is capable of having a flag indicting whether seamless reproduction can be assured between titles when data is reproduced in the order of title numbers. By the flag, it can be detected beforehand whether seamless reproduction can be realized between titles by the optical disk apparatus and it can also be known whether rearrangement is necessary in combining data.

Although seamless reproduction is assured within a title and within a chunkgroup, there is a case in which seamless reproduction is not assured between titles since a boundary of titles can be a boundary of files. However, there can be established a condition in which seamless reproduction is generally carried out by conducting rearrangement or the like as a function of the optical disk apparatus.

A field title_info_length in title_info() of FIG. 16 represents the length of title_info() by a unit of byte. A field flags_for_title is recorded with write attribute of a corresponding title (acknowledgement of change), limitation of a number of reproduction, a level of rating and so on. A field cgit_file_id is recorded with file_id of information file of chunkgroup (CHUNKGROUP_###.CGIT) which is the base of a corresponding title.

The field title_start_chunk_group_time_stamp is recorded with time of start point of reproduction of the title on a local time axis defined by a chunkgroup. The value indicates a display time of a picture indicated by a title index of the title. The field title_end_chunk_group_stamp is recorded with time of end point of reproducing the title on a local time axis defined by a chunkgroup. The value is equal to an end point of reproducing a chunkgroup or a value indicated by a title index representing start point of a title disposed immediately thereafter on the time axis.

A field title_playback_time() is recorded with reproduction time period of the title (time code value or a number of sheets of frames or fields). A field number_of_marks is recorded with a total number of marks set in the title (except title index). As shown in FIG. 37, a fieldmark_type is recorded with kinds of marks attached to arbitrary positions in the title. Mark is also utilized as a random access point in a title. A field mark_chunk_group_time_stamp is recorded with time stamps at locations where the marks are set on a time axis of a chunkgroup in an order from ones having small values. There may exist indices having time stamps the same as start point and end point of a title. A field stuffing_bytes is recorded with stuffing bytes and its length is 8n bit (n$^3$0).

Next, a further explanation will be given of chunkgroup and chunk shown in FIG. 21 through FIG. 24. CHUNKGROUP_###.CGIT is a file describing definition of time axis of title, structure of chunk and processing of nonconsecutive points included in title.

Title is constituted by various bitstreams such as bitstream having no video signal and bitstream of a DV (Digital Video) signal. In DV format, time axis is specified by a unit of frame and when a reference is constituted by STC (System Time Clock) of MPEG2 video signal, the format differs and accordingly, a bitstream of the DV signal cannot be controlled.

Hence, a local time axis is set in title. This time axis is not dependent upon a stream constituting title. A boundary of titles is set regardless of a boundary of chunks. Therefore, it is more appropriate to set the local time axis with regard to an aggregation of chunks including a plurality of (an arbitrary number of) titles rather than setting the local time axis for each chunk (in one to one correspondence with a bitstream) or for each title.

In a chunkgroup, a single time axis is defined and a chunk is pasted on the time axis by which display time of the chunk is determined. That is, chunks are arranged in a chunkgroup in a state in which contents of a bitstream file (byte string) are developed on the time axis. All of chunks included in a single bitstream file arranged on the time axis is referred to as path. A plurality of paths can be arranged in a chunkgroup. Paths specifying start time and end time of reproducing a chunkgroup are referred to as main paths and other paths are referred to as sub paths. Sub paths mainly represent chunks of audio signals additionally recorded later.

A connection point of chunks is not necessarily in coincidence with a boundary of titles and accordingly, the connection point does not constitute an attribute of title. However, when a relationship among chunks is included in attributes of each chunk, a contradiction may be caused in the hierarchy. Such information of a nonconsecutive point is disposed at an intermediary between a chunk and a title and it seems to be appropriate to plate the information in the hierarchy of a chunkgroup.

In summary, information provided to a chunkgroup are a way of arranging chunks on a time axis, a sequence of reproducing chunks, a nonconsecutive point caused at a point for connecting end of a chunk and start of a chunk to be reproduced successively and so on.

As shown in FIG. 38, file_type_id of CHUNKGROUP_###.CGIT is an identifier indicating that the file is CHUNKGROUP_###.CGIT and is expressed by a character string of 16 characters in conformity with ISO 646. In chunkgroup_time_base_flags, a flag concerning a reference counter of chunkgroup is recorded. In chunkgroup_time_base_offset, start time of reference time axis in the chunkgroup is recorded. The value is a value which is set to a counter for counting up a clock of 90 kHz and is expressed by 64 bits. An area text_block() is an area for storing various texts in which only text items permitted to use in the text_block() are described.

As shown in FIG. 22, chunk_connection_info() is a file for recording information of singular points (switching point of a video signal, synchronization of a video signal and an audio signal and so on), which specifies a connecting situation among chunks. At a singular point such as a connection point between chunks produced by editing operation, chunks must be changed in the midst of GOP. Such information at a vicinity of an editing point is described here. Chunk does not belong to two or more chunkgroups.

An area chunk_connection_info_length is recorded with a length of chunk_connection_info() expressed in a unit of byte. An area number_of_chunks is recorded with a total number of chunks used in the chunkgroup. As shown in FIG. 39, an area chunk_sync_play_flag is a flag indicating whether two or more chunks need to reproduce at the same time, the value of 0 signifies reproduction of a single chunk and the value of 1 signifies simultaneous reproduction of a plurality of chunks.

In chunk_arrangement_info() of FIG. 23, chunk_arrangement_info_length is recorded with a length of information of each chunk expressed in a unit of byte (a length including from a leading byte of chunk_arrangement_info_length to an end byte of transition_info (). An area chunk_info_file_id is recorded with file_id of chunk_info_file constituting an object.

An area chunk_switch_stream_id is recorded with stream_id of a stream consecutively reproducing two chunks when they are connected together. As the id, for example, there is used an id for identifying a video signal or an audio signal recorded in a packet header of MPEG2. An area presentation_start_cg_time_count is recorded with a time count value expressing display start time of a relevant chunk by time in a chunkgroup. The display start time of the chunk is expressed by global time stamp defined in the chunkgroup. The relevant chunk is started to be displayed from the time in the chunkgroup. An area presentation_end_cg_time_count is recorded with a time count value expressing display end time of the relevant chunk by time in the chunkgroup. The display end time of the chunk is expressed by global time stamp defined in the chunkgroup.

As shown in FIG. 40, an area original_time_count_type is recorded with a kind of time count used in the stream. For example, in the case of a stream of MPEG2 video signal, the original_time_count_type is set to '0000'. An area number_of_start_original_time_count_extension is recorded with a number of time counts representing newly required start time when a plurality of time counts are needed. An area number_of_end_original_time_count_extension is recorded with a number of time counts representing newly required end time when a plurality of time counts are needed. The area presentation_start_original_time_count is recorded with time or a counter value in the stream in correspondence with presentation_start_cg_time_count. The area presentation_end_original_time_count is recorded with time or a counter value in the stream in correspondence with presentation_end_cg_time_count.

An area to_ext_attributes is recorded with attributes for time_count_extension. The time_count_extension can be inputted with, for example, information of to which stream it is applied. An area start_original_time_count_extension is recorded with start time or a start counter value necessary for switching chunks. This is an option which is used when a plurality of time or counter values need to record. An area end_original_time_count_extension is recorded with end time or an end counter value necessary for switching chunks. This is also an option which is used when a plurality of time or counter values need to record. An area transition_info() is recorded with information necessary for providing special effect in switching chunks. For example, designation of chunk, switching time and a kind of special effect are described here.

As shown in FIG. 24, a file CHUNK_%%%%.ABST is a file recorded with characteristic points extracted from a bitstream constituting a chunk with sub_file number %%%%. The file is described with start byte position, length and attributes at each unit constituting a bitstream of GOP, Audio frame or the like. The GOT information or Audio frame information is summarized respectively as on CHUNK_%%%%.ABST for each chunk (sub-file).

As shown in FIG. 41, file_type_id of CHUNK_%%%%.ABST is recorded with an identifier indicating that it is a file recorded with stream_info() by a character string in 16 characters in conformity with ISO 646.

As shown in FIG. 42, info_type is recorded with a type of following stream_info shown in FIG. 24. Here, a kind of stream is specified. An area number_of_programs is recorded with a number of programs included in TS (Transport Stream) of MPEG2. In order to detect the number, PSI (Program Specific Information) needs to read. For the item other than TS, the value becomes 1. An area number_of_streams is recorded with a number of streams used in the program. In the case of TS, the value becomes equal to a number of different PIDs (packet identification). In the case of MPEG stream other than TS, a number of streams having different stream id's is recorded here.

An area stream_identifier is recorded with stream id or an extension of stream id. In the case of TS, PID is utilized as stream id.

As shown in FIG. 43, an area slot unit type is recorded with a way of partitioning a stream when the stream is partitioned at constant intervals. When an index of partitioning is time such as frame, field or the like, time stamp value is used. An area slot_time_length is recorded with a period of time in correspondence with 1 slot. The value is represented by a value of time stamp using a counter for counting a clock of 90 kHz. An area number_of_slots is recorded with a number of slot_info()'s written in CHUNK_%%%%.ABST. An area number_of_I_pictures_in_a_slot is recorded with a number of I-pictures included in a slot. The value is a value of an integer equal to or larger than 1 and equal to or smaller than 15. However, a number of I-pictures included in a slot disposed immediately before a slot starting with GOP header may be smaller than the value. When the slot starting with the picture header of I-picture which is not disposed immediately after GOP header is set, the value is utilized.

Next, a further explanation will be given of program shown in FIG. 17 and FIG. 18. There is only one programs in PROGRAM_$$$.PGI. There are PROGRAM_$$$.PGI by a number of programs in a volume. A program number is not defined in programs but is specified by file name or file id.

As shown in FIG. 44, an id indicating a file recorded with program() is recorded by a character string having a length of 16 in file_type_id of PROGRAM_$$$.PGI. An area text_block() is formed with an area for storing various texts. In this case, only text item permitted to use in the text_block() is described.

An area flags_for_program of program() of FIG. 18 is recorded with various flags concerning programs. For example, there are recorded write attributes of the program (acknowledgement of change), restriction of a number of times of reproduction and a level of rating.

As shown in FIG. 45, an area program_status is recorded with attributes of program. Although setting of the field is optional, when the setting is not carried out, "none" must be set.

An area program_playback_time() is recorded with a time period of reproducing the program. An area number_of_play_sequences is recorded with a number of play_sequence's used in the program. However, according to this example of format, the value is fixed to 1. That is, according to the example of format, 1 program is in correspondence with reproduction of 1 ch (channel) and accordingly, in order to realize simultaneous reproduction of 2 ch's, designation of simultaneous reproduction of 2 programs may be made feasible. Without the restriction of 1 program in correspondence with reproduction of 1 ch, simultaneous reproduction of 2 ch's can be carried out by 1 program. When two play sequences are simultaneously reproduced by using multichannel I/O, the optical disk apparatus determines to which output channel a play sequence is allocated.

An area number_of_play_lists is recorded with play list's used in the play sequence. In this example, the value is set to 1. An area play_list_strat_time_stamp_offset is recorded with time in play sequence counted by a timer which is started from start time of the play sequence. The value constitutes start time of play list. In the program, only one play list must exist in the play sequence. The unit system of time is 90 kHz (1/90000 second constitutes a minimum unit of time). An area stuffing_bytes is recorded with bytes of stuffing. The length is sets to 8n bit (n$^3$0).

Next, a further explanation will be given of a nonconsecutive point flag. In this case, the nonconsecutive point flag signifies seamless_connection_flag of play_list() of FIG. 19 or a mark recorded as a mark representing a non-seamless reproduction point as in index type 8 shown in FIG. 37.

As shown in FIG. 46, 0 of a value of seamless_connection_flag signifies that consecutive reproduction (seamless playback) with the previous play item is not guaranteed or unknown and 1 of the value signifies that seamless playback is guaranteed.

Figure 47:
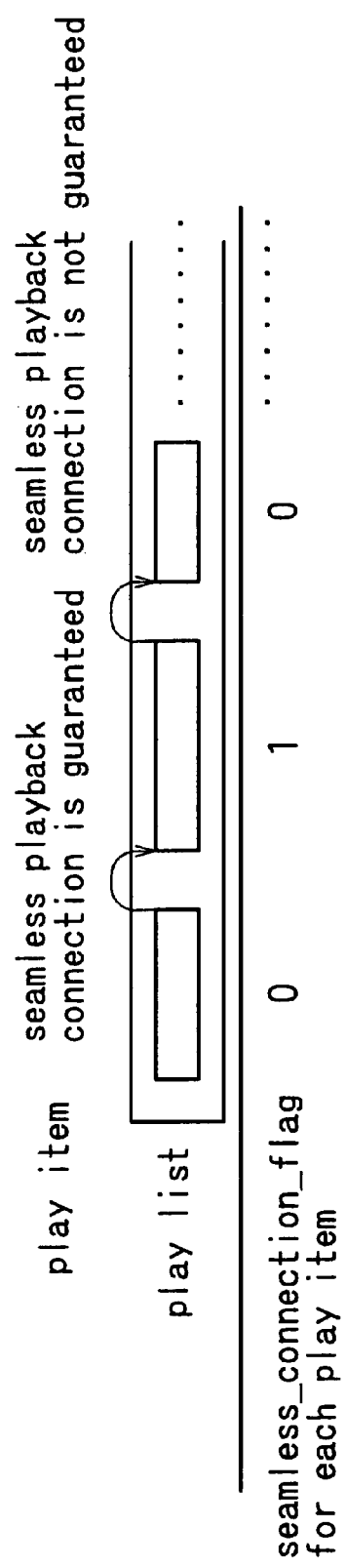
FIG. 47 is a diagram for explaining meaning of seamless_connection_flag.

That is, as shown in FIG. 47, when the flag is 0, a predetermined play item is reproduced from the previous play item (without interrupting image or voice). In contract thereto, when the flag is 1, there is a case in which at an intermediary between after the previous play time has been finished and until a successive play item is reproduced, there causes a nonconsecutive portion.

Next, an explanation will be given of a processing of recording a nonconsecutive flag of a title in reference to a flowchart of FIG. 48. First, at step S1, a user designates a title constituting a recording object by operating the input unit 14. At this occasion, at step S2, CPU 21 determines whether the title can be reproduced consecutive to an already recorded previous title when the title designated at step S1 is recorded to the optical disk 1. The determination is carried out by comparing a capacity of the reading channel buffer 6 (a time period required for decoding data of the capacity by the decoder 7) with a processing generated between titles. That is, when the reading channel buffer 6 becomes vacant during a time period until a succeeding title is reproduced, consecutive reproduction is determined to be impossible and when the reading channel buffer 6 does not become vacant, the consecutive reproduction is determined to be possible.

When the consecutive reproduction is not possible, the operation proceeds to step S3, CPU 21 controls the OSD control circuit 9 and issues a message stating that the title instructed to record currently cannot be reproduced consecutive to the already recorded title, that is, a nonconsecutive point is produced between the both. The message is displayed on a display from the combining circuit 8 via the output terminal P1.

A user sees the message and inputs whether occurrence of the nonconsecutive point is acknowledged by operating the input unit 14. When the user acknowledges occurrence of the nonconsecutive point, at step S5, CPU 21 sets the index type 8 as the index indicating a nonconsecutive point in marks shown in FIG. 37 to mark_type in title_info() of FIG. 16 and executes a processing of setting a position of generating the nonconsecutive point to mark_chunk_group_time_stamp of FIG. 16. Further, the position of recording the nonconsecutive point to the mark_chunk_group_time_stamp (position of generating the nonconsecutive point) can be made an arbitrary position. Accordingly, normally, a point of causing insignificant influence even when the nonconsecutive point is generated (for example, a leading area of a succeeding title or an end portion of a previous title) is recorded here.

Further, title_info() set in this way is supplied and stored to the writing channel buffer 11, thereafter, read from there at a predetermined timing and is supplied and recorded to the optical disk 1 via the switch 5, the ECC circuit 4, RF and the demodulating/modulating circuit 3 and the optical head 2.

Next, the operation proceeds to step S6, CPU 21 determines whether other point which cannot be consecutively reproduced is present in the title and when there is other consecutive point of reproduction, the operation returns to step S3 and a processing thereafter is repeatedly executed. When it is determined that other nonconsecutive point of reproduction is not present in the title, the processing is finished.

In the meantime, when a user inputs that occurrence of a nonconsecutive point is not acknowledged, the operation proceeds to step S7 and CPU 21 determines whether an intermediary between two titles constituting an object can consecutively be reproduced by changing positions of recording titles on the disk. When it is determined that the noted portion can be consecutively reproduced by changing positions of recording titles, CPU 21 proceeds to step S8, changes the recording position of a portion of the titles on the disk such that the noted portion can be reproduced consecutively and thereafter, the operation proceeds to step S6.

At step S7, when it is determined that the recording positions of titles cannot be changed, the operation proceeds to step S5, as mentioned above, the nonconsecutive point is recorded as mark_type and the position of generating the nonconsecutive point is recorded in mark_chunk_group_time_stamp.

After the processing, recording operation of the title designated at step S1 is executed. Or, such a processing may be carried out after recording the title.

Next, an explanation will be given of a processing in the case in which a nonconsecutive flag is recorded in forming a program in reference to a flowchart of FIG. 49. First, at step S21, the user designates a title included in the program by operating the input unit 14. When the designation is carried out, at step S22, CPU 21 designates a necessary portion in the title designated at step S21 by a reproduction start point and a reproduction end point. CPU 21 forms a play item (FIG. 20) in correspondence with the designation.

Next, at step S23, CPU 21 determines whether consecutive reproduction is feasible with previous play item (the determination is also carried out based on a comparison between a processing time period caused between play items and the capacity of the reading channel buffer 6 (decoding time period of the capacity)). When the consecutive reproduction is not possible, the operation proceeds to step S24 and controls the OSD control circuit 9 and displays by a message that a nonconsecutive point is generated. With regard to the message, the user inputs whether the user acknowledges occurrence of the nonconsecutive point by operating the input unit 14. At this occasion, CPU 21 determines whether the user acknowledges occurrence of the nonconsecutive point at step S25. When it is determined that the user acknowledges occurrence of the nonconsecutive point, the operation proceeds to step S26 and sets seamless_connection_flag of the play item to 0. As has been explained in reference to FIG. 46, that the flag is 0 signifies that the consecutive reproduction is not guaranteed.

Next, the operation proceeds to step S27 and CPU 21 determines whether the processing of forming the program has been finished. When it is determined that the processing has not been finished yet, the operation returns to step S23 and repeatedly executes a processing thereafter. When it is determined that the processing of forming the program has been finished at step S27, the processing is finished.

In the meantime, when it is determined that the user does not acknowledge occurrence of the nonconsecutive point at step S25, the operation proceeds to step S28 and CPU 21 determines whether the recording position (arrangement position) on the optical disk 1 of a stream constituting an object is to be changed or whether partial rerecording is feasible. When the rearrangement processing or the partial rerecording of the stream is feasible, the operation proceeds to step S29 and CPU 21 executes a processing of changing the recording position to a position where the consecutive reproduction is feasible. Further, in this case, at step S30, CPU 21 sets seamless_connection_flag of the play item to 1. As has been explained in reference to FIG. 46, 1 of the flag signifies that the consecutive reproduction is guaranteed. Thereafter, the operation proceeds to step S27 and a processing thereafter is executed.

When it is determined that the rearrangement processing or the partial rerecording of the stream is impossible at step S28, the operation proceeds to step S26 and a processing similar to that in the case in which a user acknowledges occurrence of the nonconsecutive point is executed.

When it is determined that the consecutive reproduction is feasible with the previous play item at step S23, the operation proceeds to step S30 and immediately, 1 is set to seamless_connection_flag of the play item.

Next, an explanation will be given of a processing in the case in which when a nonconsecutive flag is recorded to title as has been explained in reference to FIG. 48, reproduction thereof is instructed in reference to a flowchart of FIG. 50.

First, at step S41, CPU 21 reads a nonconsecutive point flag of the designated title, at step S42, CPU 21 starts a processing of reproducing the title and determines whether the title of which reproduction has been started is finished at step S43. When reproduction of the title has not been finished, the operation proceeds to step S44 and CPU 21 determines whether the position represented by the nonconsecutive point flag (mark_chunk_group_time_stamp) has been reproduced and returns to step S43 when it is determined that the position has not been reproduced.

When it is determined that the position represented by the nonconsecutive point flag has been reproduced at step S44, the operation proceeds to step S45 and CPU 21 determines whether a player (in the current case, the optical disk apparatus) needs a gap for consecutive reproduction of a succeeding portion. The determination is carried out based on an amount of data stored to the reading channel buffer 6 at the time point (a time period required for decoding the amount of data by the decoder 7). When the amount of data is sufficient, it is determined that the gap is not needed and when the amount of data is insufficient, it is determined that the gap is needed. When the optical disk apparatus does not need the gap for consecutive reproduction of the succeeding portion (when data is sufficiently stored to the reading channel buffer 6), the operation returns to step S43 and a processing thereafter is repeatedly executed.

In contrast thereto, when it is determined at step S45 that the optical disk apparatus needs the gap for reproducing the succeeding portion (when data is not stored sufficiently to the reading buffer 6, the operation proceeds to step S46 and CPU 21 generates the gap. That is, although CPU 21 continues writing data to the reading channel buffer 6 as it is, CPU 21 interrupts to read data from the decoder 7 and increases the amount of data of the reading channel buffer 6. Further, the operation proceeds to step S47, determines whether the consecutive reproduction of the succeeding portion is made feasible and returns to step S46 and continues the processing of generating the gap when it is not feasible.

In this way, when a predetermined amount of data is written to the reading channel buffer 6 and it is determined at step S47 that a state in which the consecutive reproduction of the succeeding portion can be executed is brought about, the operation proceeds to step S48 and CPU 21 again continues the reproduction (restart decoding by the decoder 7) and thereafter, the operation returns to step S43 and a processing thereafter is repeatedly executed.

In the meantime, when it is determined in step S43 that the consecutive reproduction of the title has been finished, the operation proceeds to step S49 and CPU 21 determines whether a title to be reproduced successively is present. When there is no successively reproduced title, the processing is finished. In contrast thereto, when it is determined that the successively reproduced title is present, the operation proceeds to step S50 and CPU 21 determines whether a nonconsecutive flag is present at an end area of the preceding title. When it is determined that a nonconsecutive flag is present at the end portion of the previously reproduced title, the operation proceeds to step S51 and CPU 21 determines whether the player (optical disk apparatus) needs a gap for reproducing a succeeding title. When it is determined that the gap is needed, the operation proceeds to step S52, CPU 21 executes a processing of generating a gap, determines whether the reproduction of the succeeding title becomes feasible at step S53, returns to step S52 when it is not feasible and repeatedly executes the gap generating processing.

When it is determined at step S53 that the consecutive reproduction of the succeeding title is feasible, the operation returns to step S41 and a processing thereafter is repeatedly executed.

When it is determined at step S50 that the nonconsecutive flag is not present at the final area of the preceding title, the operation returns to step S41 and the processing thereafter is executed. Further, even when the nonconsecutive flag is present at the end area of the preceding title, in the case where it is determined at step S51 that the optical disk apparatus does not need a gap for reproducing the succeeding title (for example, when the capacity of the reading channel buffer 6 of the optical disk apparatus is sufficiently large or the like), the operation returns to step S41 and the processing thereafter is executed.

Figure 49:
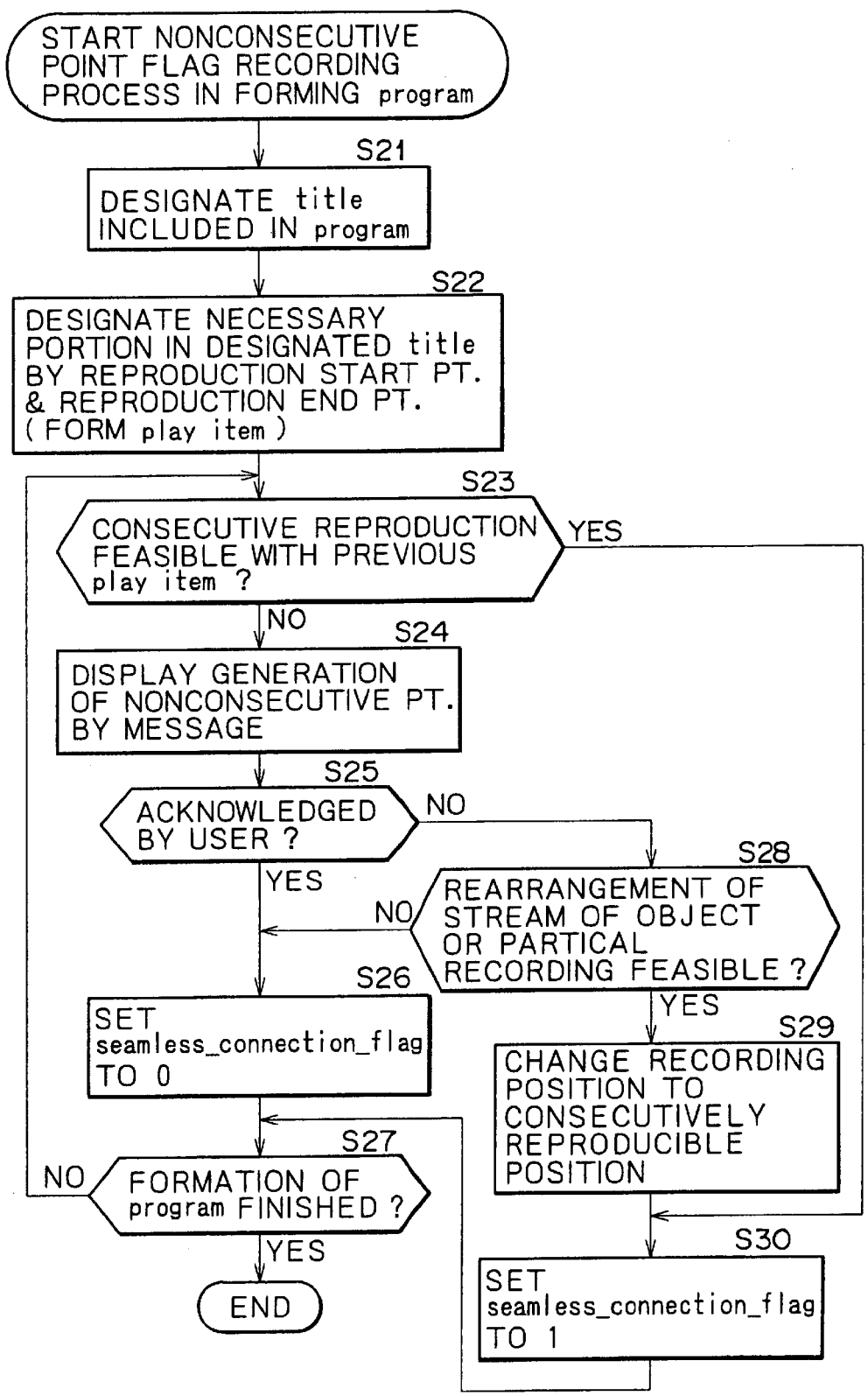
FIG. 49 is a flowchart for explaining a recording processing of a nonconsecutive point flag in forming a program.
Figure 51:
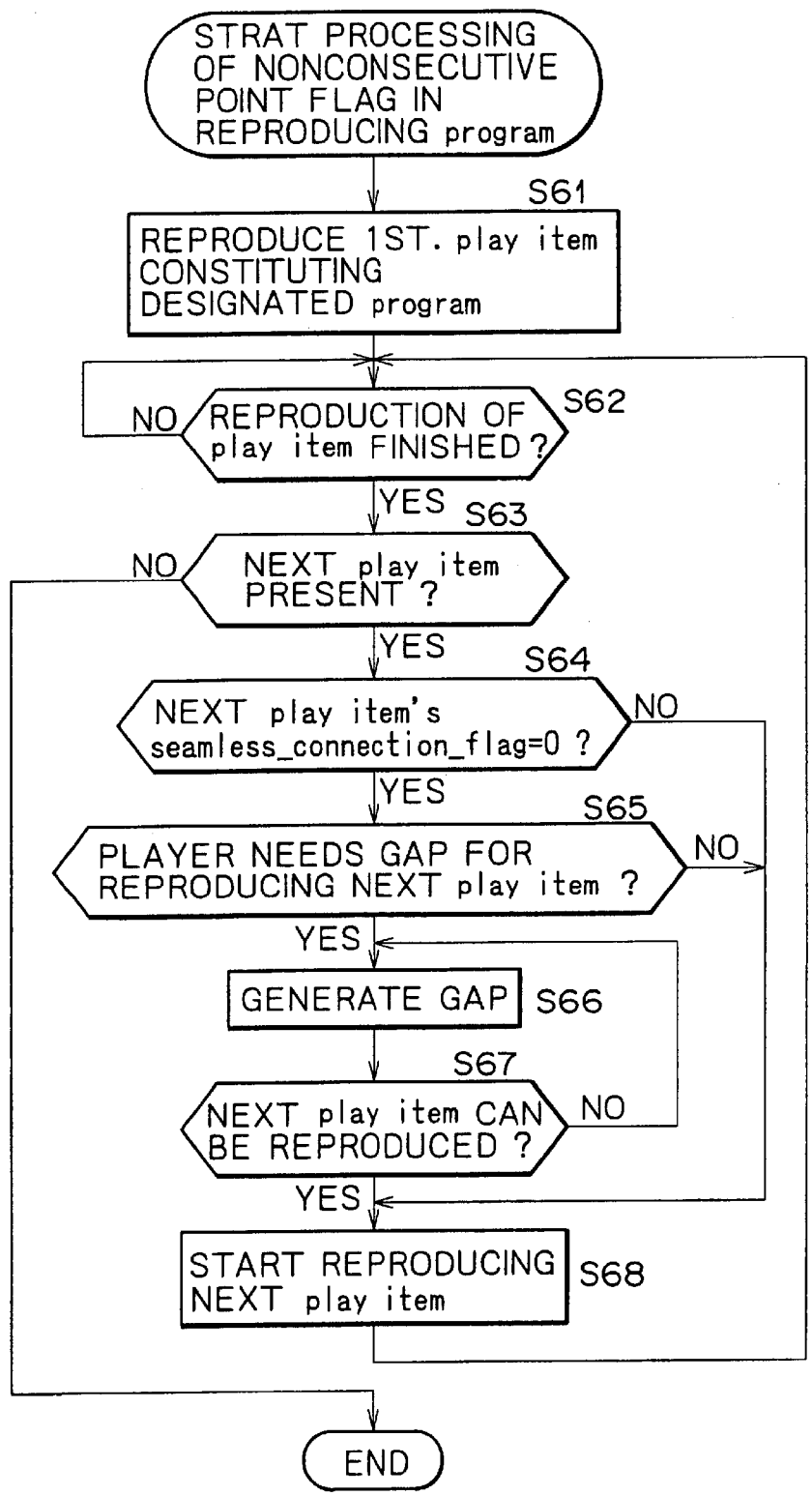
FIG. 51 is a flowchart for explaining a processing of a nonconsecutive point flag in reproducing program.

Next, an explanation will be given of a processing in the case when a program is formed as shown in FIG. 49, reproduction of the program is instructed in reference to a flowchart of FIG. 51.

First, at step S61, CPU 21 reproduces a fist play item constituting the designated program. At step S62. CPU 21 determines whether reproduction of the play item has been finished and when the play item has not been finished, CPU 21 awaits for finishing of the reproduction.

When it is determined at step S62 that reproduction of the play item has been finished, CPU 21 proceeds to step S63 and determines whether a succeeding play item is present. When it is determined that a succeeding play item is present, the operation proceeds to step S64 and CPU 21 determines whether seamless_connection_flag of the succeeding play item is 0. When it is determined that the flag is 0 (when seamless reproduction is not guaranteed), the operation proceeds to step S65 and CPU 21 determines whether the optical disk apparatus needs a gap for reproducing the succeeding play item. When the gap is needed, the operation proceeds to step S66 and executes the processing of generating the gap. Further, at step S67, the operation determines whether a state in which the succeeding play item can be reproduced is brought about and returns to step S66 and repeatedly executes the gap generating processing when the state in which the succeeding play item can be reproduced is not brought about yet.

When it is determined at step S67 that the state in which the succeeding play item can be reproduced is brought about (when a sufficient amount of data is written to the reading channel buffer 6), the operation proceeds to step S68 and CPU 21 starts the processing of reproducing the succeeding play item. Thereafter, the operation returns to step S62 and the processing thereafter is repeatedly executed.

when it is determined at step S64 that seamless_connection_flag of the succeeding play item is not 0 (when it is determined to be 1) or when it is determined in step S65 that the optical disk apparatus does not need the gap for reproducing the succeeding play item, processes at step S66 and at the step S67 are skipped and the operation proceeds to step S68. Further, reproduction of the succeeding play item is started and thereafter, the operation returns to step S62.

Although in the above description, an explanation has been given of an example of a case in which the invention is applied to an optical disk apparatus, the invention is applicable also to a case in which information is recorded or reproduced to or from other record medium.

Further, as a program offering medium for offering the computer program for executing the above-described processing to the user, there can be utilized a communication medium such as a network or a satellite other than a record medium of a magnetic disk, CD-ROM, a solid memory or the like.

As has been described, according to a recording/reproducing apparatus, a recording/reproducing method and a program offering medium specified in the present invention, it is determined whether data can be reproduced consecutive to already recorded data and a processing with regard to consecutive reproduction is executed in correspondence with a result of the determination and accordingly, there can be realized a record medium capable of ensuring compatibility.

According to a recording/reproducing apparatus, a recording/reproducing method and a program offering medium specified in the present invention, a gap is added in correspondence with information of consecutive reproduction extracted from a record medium and accordingly, regardless of a change in a capacity of a buffer of a recording/reproducing apparatus, compatibility can be ensured. Therefore, it is possible to restrain what a user erroneously recognizes a failure of the apparatus.

What is claimed is:

1. A recording apparatus comprising:

recording means for recording data to a record medium;

determining means for determining whether the data can consecutively be reproduced when the data is recorded to the record medium; and executing means for executing a processing in respect of consecutive reproduction of the data in correspondence with a result of determination of the determining means.

2. The recording apparatus according to claim 1:

wherein the executing means changes a position of recording the data when the determining means determines that the consecutive reproduction cannot be executed.

3. The recording apparatus according to claim 1:

wherein the executing means records information of the consecutive reproduction expressing that the consecutive reproduction cannot be executed to the record medium when the determining means determines that the consecutive reproduction cannot be executed.

4. A recording method of a recording apparatus, said recording method comprising:

a step of recording data to a record medium;

a step of determining whether the data can consecutively be reproduced when the data is recorded on the record medium; and a step of executing a processing in respect of consecutive reproduction of the data in correspondence with a result of the determination.

5. A program offering medium offering a program for executing a processing, said processing comprising:

a step of recording data to a record medium;

a step of determining whether the data can consecutively be reproduced when the data is recorded on the record medium; and a step of executing a processing in respect of consecutive reproduction of the data in correspondence with a result of the determination.

6. A reproducing apparatus comprising:

reproducing means for reproducing data recorded on a record medium;

extracting means for extracting information of consecutive reproduction expressing whether the consecutive reproduction of the data can be executed from the data reproduced by the reproducing means; and adding means for adding a gap to the data reproduced by the reproducing means in correspondence with the information of the consecutive reproduction extracted from the extracting means.

7. A reproducing method comprising:

a step of reproducing data recorded on a record medium;

a step of extracting information of consecutive reproduction expressing whether the consecutive reproduction of the data can be executed from the reproduced data; and a step of adding a gap to the reproduced data in correspondence with the extracted information of the consecutive reproduction.

8. A program offering medium for offering a program executing a processing, said processing comprising:

a step of reproducing data recorded on a record medium;

a step of extracting information of consecutive reproduction expressing whether the consecutive reproduction of the data can be executed from the reproduced data; and a step of adding a gap to the reproduced data in correspondence with the extracted information of the consecutive reproduction.

* * * * *